US007235011B2

(12) United States Patent
Randall et al.

(10) Patent No.: US 7,235,011 B2
(45) **Date of Patent: *Jun. 26, 2007**

(54) GAMING DEVICE HAVING A BONUS GAME WITH MULTIPLE PLAYER SELECTABLE AWARD OPPORTUNITIES

(75) Inventors: Dov L. Randall, Manchester (GB); Peter Gerrard, Manchester (GB); Anthony J. Baerlocher, Reno, NV (US); Peter J. A. Marsh, Leight (GB); Tonja M. Peterson, Reno, NV (US)

(73) Assignee: IGT, Reno, NV (US)

( * ) Notice: Subject to any disclaimer, the term of this patent is extended or adjusted under 35 U.S.C. 154(b) by 316 days.

This patent is subject to a terminal disclaimer.

(21) Appl. No.: 10/660,076

(22) Filed: Sep. 10, 2003

(65) Prior Publication Data

US 2004/0147306 A1 Jul. 29, 2004

Related U.S. Application Data

(63) Continuation-in-part of application No. 10/237,207, filed on Sep. 6, 2002.

(51) Int. Cl.
*A63F 13/00* (2006.01)

(52) U.S. Cl. .......................................................... 463/25

(58) Field of Classification Search .................. 463/20, 463/25, 16; 273/143 R, 139, 138.1
See application file for complete search history.

(56) References Cited

U.S. PATENT DOCUMENTS

| | | | |
|---|---|---|---|
| 5,393,057 | A | 2/1995 | Marnell, II |
| 5,407,200 | A | 4/1995 | Zalabak |
| 5,423,539 | A | 6/1995 | Nagao |
| 5,560,603 | A | 10/1996 | Seelig et al. |
| 5,647,798 | A | 7/1997 | Falciglia |
| 5,772,506 | A | 6/1998 | Marks et al. |
| 5,775,692 | A | 7/1998 | Watts et al. |

(Continued)

FOREIGN PATENT DOCUMENTS

| | | |
|---|---|---|
| DE | 3638100 | 5/1988 |

(Continued)

OTHER PUBLICATIONS

Catch A Wave Advertisement written by IGT, published in Dec. 2000.

(Continued)

*Primary Examiner*—Kim Nguyen
(74) *Attorney, Agent, or Firm*—Bell, Boyd & Lloyd LLP

(57) ABSTRACT

A gaming device and method having a game with multiple player selectable award opportunities. In one embodiment, the gaming device displays a plurality of groups to a player. Each of the groups include related award opportunities. An indicator simultaneously indicates at least two of the award opportunities in one of the groups. In an alternative embodiment, components of an award opportunity are accumulated in an accumulated award opportunity. The accumulated award opportunity is indicated along with at least one other award opportunity. The player chooses one of the indicated award opportunities and receives the outcome which results from the indicated award opportunity picked by the player. In one embodiment, the average expected values of the outcomes which result from the indicated award opportunities in each group are approximately equal.

47 Claims, 16 Drawing Sheets

U.S. PATENT DOCUMENTS

| | | | |
|---|---|---|---|
| 5,855,514 | A | 1/1999 | Kamille |
| 5,918,880 | A | 7/1999 | Voigt, IV et al. |
| 5,935,002 | A | 8/1999 | Falciglia |
| 5,964,463 | A | 10/1999 | Moore, Jr. |
| 5,971,849 | A | 10/1999 | Falciglia |
| 5,988,638 | A | 11/1999 | Rodesch et al. |
| 6,003,867 | A | 12/1999 | Rodesch et al. |
| 6,012,982 | A | 1/2000 | Piechowiak et al. |
| 6,162,121 | A | 12/2000 | Morro et al. |
| 6,173,955 | B1 | 1/2001 | Perrie et al. |
| 6,174,233 | B1 | 1/2001 | Sunaga et al. |
| 6,190,254 | B1 | 2/2001 | Bennett |
| 6,203,429 | B1 | 3/2001 | Demar et al. |
| 6,220,959 | B1 | 4/2001 | Holmes, Jr. et al. |
| 6,270,409 | B1 | 8/2001 | Shuster |
| 6,270,411 | B1 | 8/2001 | Gura et al. |
| 6,305,686 | B1 | 10/2001 | Perrie et al. |
| 6,309,300 | B1 * | 10/2001 | Glavich ....................... 463/26 |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,340,158 | B2 | 1/2002 | Pierce et al. |
| 6,364,768 | B1 | 4/2002 | Acres et al. |
| 6,394,902 | B1 | 5/2002 | Glavich et al. |
| 6,398,644 | B1 | 6/2002 | Perrie et al. |
| 6,443,452 | B1 | 9/2002 | Brune |
| 6,471,208 | B2 | 10/2002 | Yoseloff et al. |
| 6,481,713 | B2 | 11/2002 | Perrie et al. |
| 6,491,584 | B2 | 12/2002 | Graham et al. |
| 6,537,152 | B2 | 3/2003 | Seelig et al. |
| 6,561,904 | B2 | 5/2003 | Locke et al. |
| 6,569,016 | B1 | 5/2003 | Baerlocher |
| 6,602,137 | B2 | 8/2003 | Kaminkow et al. |
| 6,604,740 | B1 | 8/2003 | Singer et al. |
| 6,726,563 | B1 | 4/2004 | Baerlocher et al. |
| 6,733,389 | B2 | 5/2004 | Webb et al. |
| 6,776,711 | B1 | 8/2004 | Baerlocher |
| 6,796,901 | B2 | 9/2004 | Baerlocher |
| 6,805,349 | B2 | 10/2004 | Baerlocher et al. |
| 6,852,028 | B2 | 2/2005 | Vancura |
| 6,869,360 | B2 | 3/2005 | Marks et al. |
| 6,905,406 | B2 | 6/2005 | Kaminkow et al. |
| 6,913,532 | B2 | 7/2005 | Baerlocher et al. |
| 6,921,335 | B2 | 7/2005 | Rodgers et al. |
| 6,955,600 | B2 | 10/2005 | Glavich et al. |
| 2001/0009865 | A1 | 7/2001 | Demar et al. |
| 2002/0010017 | A1 | 1/2002 | Bennett |
| 2003/0040355 | A1 | 2/2003 | Baerlocher |
| 2003/0060272 | A1 | 3/2003 | Glavich et al. |
| 2003/0073483 | A1 | 4/2003 | Glavich et al. |
| 2003/0162585 | A1 | 8/2003 | Bigelow et al. |
| 2003/0203753 | A1 | 10/2003 | Muir et al. |
| 2003/0216162 | A1 * | 11/2003 | Vancura ....................... 463/10 |
| 2004/0002372 | A1 | 1/2004 | Rodgers et al. |
| 2004/0038731 | A1 | 2/2004 | Englman |
| 2004/0048649 | A1 * | 3/2004 | Peterson et al. .............. 463/20 |
| 2004/0053669 | A1 | 3/2004 | Gerrard et al. |
| 2005/0049035 | A1 | 3/2005 | Baerlocher et al. |
| 2005/0233801 | A1 | 10/2005 | Baerlocher |
| 2005/0266917 | A1 | 12/2005 | Glavich et al. |

FOREIGN PATENT DOCUMENTS

| | | |
|---|---|---|
| DE | 4301855 | 7/1994 |
| DE | 19613455 | 8/1997 |
| DE | 19936196 | 1/2001 |
| EP | 0 874 337 A1 | 10/1998 |
| EP | 0 981 119 A2 | 2/2000 |
| GB | 2322217 | 8/1998 |
| WO | WO 00/32286 | 6/2000 |
| WO | WO 01/26019 A1 | 4/2001 |

OTHER PUBLICATIONS

Dolphin Treasure Advertisement written by Aristocrat Leisure Industries Pty., Ltd., published in 1996.

Spin Til You Win Game Description written by IGT, published in 1996.

* cited by examiner

| | 250 Avg. Expected Value | 260 Overall Probability |
|---|---|---|
| 220 Bonus Game A | 2000 250a | 10% 260a |
| 222 Bonus Game B | 1000 250b | 27.5% |
| 224 Bonus Game C | 500 250c | 30% |
| 226 Bonus Game D | 250 250d | 32.5% 260d |

FIG. 11

300

| RANGE AND EXPECTED VALUE OF ACCUMULATED AWARD OPPORTUNITY | GAME | AVERAGE EXPECTED VALUE OF GAME |
|---|---|---|
| > 1500 | A | 2000 |
| 750 - 1500 | B | 1000 |
| 375 - 750 | C | 500 |
| < 375 | D | 250 |

GAMING DEVICE HAVING A BONUS GAME WITH MULTIPLE PLAYER SELECTABLE AWARD OPPORTUNITIES

PRIORITY CLAIM

This application is a continuation-in-part of and claims the benefit of U.S. patent application Ser. No. 10/237,207, filed Sep. 6, 2002, the contents of which are incorporated in its entirety herein.

This application relates to the following commonly owned applications: "GAMING DEVICE HAVING A RE-TRIGGER SYMBOL BONUS SCHEME," Ser. No. 09/981,133; now U.S. Pat. No. 6,913,532; "GAMING DEVICE HAVING REGENERATING MULTIPLE AWARD OPPORTUNITIES," Ser. No. 09/960,784; "GAMING DEVICE HAVING FREE GAMES BONUS WITH A CHANGING MULTIPLIER," Ser. No. 10/086,146; "GAMING DEVICE HAVING A BONUS GAME WITH MULTIPLE PLAYER SELECTABLE AWARD OPPORTUNITIES," Ser. No. 10/237,207; "GAMING DEVICE HAVING A RE-TRIGGERING SYMBOL BONUS SCHEME WITH A BONUS SYMBOL ACCUMULATOR," Ser. No. 10/071,441; "GAMING DEVICE INCLUDING A GAME HAVING PLAYER SELECTED FUNCTION BASED ON SYMBOLS IN A FREE SPINS GAME," Ser. No. 10/243,052; "GAMING DEVICE HAVING A PROBABILITY ENHANCING TRIGGER SYMBOL," Ser. No. 10/241,255; "GAMING DEVICE INCLUDING A GAME HAVING A WILD SYMBOL RELATED AWARD," Ser. No. 10/633,391; "GAMING DEVICE HAVING A PROBABILITY-ENHANCING TRIGGER SYMBOL," Ser. No. 10/661,443; "GAMING DEVICE HAVING A FREE SPIN GAME," Ser. No. 10/953,812; "GAMING DEVICE HAVING SEQUENTIAL ACTIVATIONS OF A GAME AND REPLAY OF PREVIOUS ACTIVATIONS OF THE GAME," Ser. No. 10/956,508; "GAMING DEVICE WITH CHANGING WILD SYMBOLS," Ser. No. 10/956,303; "GAMING DEVICE HAVING FREE SPIN MODE WITH SYMBOL ELIMINATION," Ser. No. 10/953,818; "GAMING DEVICE HAVING A RE-TRIGGERING SYMBOL BONUS SCHEME WITH A BONUS SYMBOL ACCUMULATOR AND PLAYER SELECTION OF ACCUMULATION TOTAL," Ser. No. 10/952,656; and "GAMING DEVICE HAVING A RE-TRIGGER SYMBOL BONUS SCHEME," Ser. No. 11/156,112.

COPYRIGHT NOTICE

A portion of the disclosure of this patent document contains or may contain material, which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the gaming device having a bonus event and specifically, to a bonus event with multiple player selectable award opportunities.

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one known method for enhancing player enjoyment and excitement.

Gaming devices having bonus games generally employ a triggering event that occurs during the operation of the base game of the gaming device. The triggering event temporary stalls or halts the base game play and enables a player to enter a second, different game, which is the secondary or bonus game. The player plays the bonus game, likely receives an award, and returns to the base game.

Bonus games exist that display multiple selections or options to a player. The player picks one of the options to obtain an award in the bonus game. Thus, the player's award depends on which option the player selects in the bonus game. One such bonus game is included in the "Jazzy Jackpots™" gaming device manufactured by Atronic Americas, LLC. In this game, the gaming device displays five reels to a player. Each reel includes several symbols including a coin symbol having a sun pattern on one side of the coin symbol. When three or more coin symbols occur in any position on the reels, the coin symbols begin to flip or turn. If three or more coin symbols display the sun pattern when the coin symbols stop flipping, the gaming device initiates the Jazzy Jackpots™ bonus game or secondary game. In the bonus game, the gaming device displays two predetermined options to the player. One option includes a video of a wheel, which the player spins to obtain free spins of the reels in the primary game and a multiplier. The other option is a video of an antique slot machine having a set of three reels where the player spins the reels to obtain credits. The player is provided with five free spins of the reels. The player spins the reels to obtain credits, which are multiplied by a multiplier based on the player's wager. The player chooses one of these two games to obtain an award in the bonus game. Thus, the player receives either free spins or credits depending on the particular game selected by the player in the bonus game.

Gaming devices that increase the opportunities to obtain awards and increase the size of the awards are desirable. Additionally, gaming devices that enable players to choose between different award selections or options increases the player's excitement and enjoyment of the game. Players are attracted to games that provide additional awards and different options to the player. Therefore, to increase player enjoyment and excitement, it is desirable to provide new games for gaming devices.

SUMMARY OF THE INVENTION

The present invention is directed to a gaming device having a bonus game and specifically, a gaming device having a bonus game with multiple player selectable award opportunities. The award opportunities may provide predetermined or randomly determined outcomes. In one preferred embodiment, the award opportunities are divided or grouped in groups such as pairs of award opportunities, which are related to one another. In this embodiment, a processor randomly selects and causes an indicator to indicate one of the groups such as a pair of award opportunities. A player then chooses one of the award opportunities in the indicated group to obtain the award opportunity and receives the outcome associated with the selected award opportunity. The outcome may be a value provided to the player or it may not have a value. Therefore, the player picks one of the indicated award opportunities and receives the value of the outcome, if any, associated with that award opportunity. If the player receives an award, which results from the picked award opportunity, the award is added to the player's total award in the game. In one embodiment, the outcomes of the award opportunities in the group or pair of award opportunities each have approximately the same average expected value.

In another embodiment, the average expected values of the outcomes for the award opportunities in a group are different. Therefore, the player attempts to pick the award opportunity from the group of award opportunities that generates the higher average expected value. In one embodiment, when the player picks the award opportunity including the lower average expected value, the gaming device determines the difference between the average expected values of the two award opportunities in the group and transfers the value difference to a progressive jackpot or award. The gaming device provides the progressive jackpot to a player when a triggering event occurs in the game. In one embodiment, the triggering event includes a progressive award opportunity, symbol or combination of symbols being indicated by the indicator. In another embodiment, the processor automatically picks the progressive award opportunity when a particular award opportunity or group of award opportunities are indicated by the indicator.

In one embodiment, a probability of being indicated by the indicator is associated with each group of the award opportunities in the game. In one embodiment, the average expected values of the outcomes associated with at least one group of the award opportunities are relatively large values. In this embodiment, a probability of being indicated is associated with each of the award opportunities having the outcomes with relatively large average expected values such that the probability of being indicated associated with the award opportunities having outcomes with relatively large average expected values is less than the probabilities of being indicated associated with the other award opportunities having outcomes with smaller average expected values. In another embodiment, the probability of being indicated associated with the award opportunities vary inversely with the average expected values of the outcomes associated with the award opportunities.

In one embodiment, a mechanical wheel having a plurality of sections is displayed to a player. Groups of opportunities are associated with the sections on the wheel. The groups include related award opportunities, which are positioned on opposing sections of the wheel. An indicator simultaneously indicates two of the sections having related award opportunities. The player chooses one of the indicated award opportunities associated with the indicated sections on the wheel. The player then receives the outcome which results from the picked award opportunity. The outcome may or may not provide an award to the player. Thus, the player receives the award or value, if any, from the outcome of the award opportunity picked by the player and the game ends.

The groups, such as groups including pairs of related award opportunities, could be arranged or displayed in any suitable manner. In one embodiment, for instance, the award opportunities are arranged in two groups such as columns. Each column includes several sections and each section includes an award opportunity. An indicator is positioned between the columns and simultaneously indicates one of the sections in each column. The player picks one of the two award opportunities associated with the indicated sections on the columns. The player receives the outcome, which results from the award opportunity picked by the player.

Although the present invention is primarily discussed relative to a bonus game of a gaming device, it should be appreciated that the present invention could be employed as a primary game in a gaming device. In one embodiment of a primary game, groups of award opportunities are displayed to the player. The award opportunities include several related pairs of bonus events such as bonus games. The indicator indicates two of the bonus games in one of the groups and the player picks one of the indicated bonus games. The player receives the value, if any, of the outcome, which results from the picked bonus game. It should be appreciated that the award opportunities in the primary game may include any suitable types of award opportunities.

In another embodiment, the award opportunities include several bonus events where at least one of the award opportunities in each group of award opportunities includes a bonus event. In this embodiment, the bonus events are bonus games-selected from one or more groups of bonus games. A probability of being selected by the processor is associated with each of the bonus games in the groups. In one embodiment, the processor selects a bonus game from one group of bonus games based on the probabilities when an award opportunity including a bonus game symbol is indicated by the indicator. In another embodiment, the processor selects the bonus game from a plurality of groups of bonus games based on the probabilities. In a further embodiment, the probabilities associated with each of the bonus games in the groups change after each bonus game is indicated by the indicator. In another embodiment, the probabilities associated with each of the bonus games in the groups change after a plurality of bonus games are indicated by the indicator. It should be appreciated that the probabilities associated with each of the bonus games may change after one or more bonus game symbols are indicated by the indicator.

In an alternative embodiment of the present invention, the gaming device provides one or more of the award opportunities which each include components accumulated in a game. Upon a predetermined or random event during the game, the gaming device ceases the accumulation of components of one of the award opportunities. The gaming device then indicates at least two award opportunities wherein at least one of those award opportunities includes the accumulated components. The player, or, alternatively, the game, selects one of those award opportunities, and the gaming device provides the player the outcome, if any, resulting from the selected award opportunity.

In one embodiment, the gaming device predetermines or randomly selects or generates components of award opportunities, indicating at least one component to be added or accumulated to create an accumulated award opportunity. The components include any suitable award, value or other suitable outcome, including, but not limited to, free activations or spins, win spins which guarantee an award to the player, free games, progressive awards, progressive numbers of free spins, and other modifiers. It should be appreciated that the components may increase or decrease the potential outcome of the accumulated award opportunity.

The present invention contemplates any suitable mechanism, gaming sequence or functional structure to accumulate the components of one of the award opportunities. In one embodiment, the gaming device randomly selects, designates or indicates a position or determines the number of positions to be moved by a player indicator from a plurality of adjacently arranged positions. The positions, in one embodiment, include component-accumulating positions and selection positions. At least one predetermined or randomly selected award opportunity or at least one component of an award opportunity such as a predetermined number of free spins or a modifier is associated with each such component accumulating position. The gaming device moves a player indicator a number of positions randomly determined by the gaming device. When the player indicator is moved to a component-accumulating position, the component of the award opportunity associated with that position is added to the accumulated award opportunity. In one embodiment, the award opportunity component associated with each component-accumulating position is revealed to the player when the player moves to the component-accumulating position.

The components of the accumulated award opportunity are accumulated in the outcome-generating game until a triggering or designated event requires the game or the player to select one of the plurality of indicated award opportunities. In one embodiment, the triggering event includes moving the player indicator to a selection position where indicated award opportunities include at least one of the accumulated award opportunities comprising the components accumulated in previous moves during the game and at least one award opportunity associated with the selection position. In one embodiment, a plurality of award opportunities are associated with at least one selection position. In one embodiment, the gaming device randomly selects or indicates at least one of the plurality of award opportunities associated with the selection position to be presented to the player for selection. Alternatively, the player must select from the plurality of award opportunities associated with the selection position and at least one of the accumulated award opportunities. In one embodiment, the award opportunities include an alternative game including any suitable bonus event described herein or otherwise. The player receives the outcome of the indicated bonus game selected by the player.

If the accumulated award opportunity is selected, the player receives the outcome of the accumulated award. Alternatively, the player is enabled to apply the outcome to an alternative game or sub-game to determine the outcome provided to the player. Similar to the embodiment including selection of a bonus event discussed above, in one embodiment, the gaming device selects the sub-game from a plurality of different sub-games.

In one embodiment, a probability is associated with each of the components of the accumulated award opportunities and, alternatively, or in addition to, a probability is associated with each award opportunity itself. In one embodiment, the probability is associated with each component-accumulating position and each selection position. The likelihood that a player will accumulate the component of an award opportunity associated with a component-accumulating position or be confronted with making a selection among award opportunities at a selection position is determined by the probability associated with that position. Similarly, in one embodiment, a probability is associated with each award opportunity available to the player at a selection position such as the bonus events or sub-games associated with the award opportunities of the selection position. In one embodiment, the probability associated with an award opportunity having a high average expected value, is inversely related to an award opportunity having a lower average expected value.

If the player has accumulated a predetermined maximum or threshold number of components or a maximum or threshold potential outcome of any of the award opportunities, in one embodiment, the player is automatically provided a selection between at least one of the accumulated award opportunities and at least one of the other award opportunities.

It is therefore an advantage of the present invention to provide a gaming device having a bonus event with multiple player selectable award opportunities where the player chooses between at least two indicated award opportunities.

A further advantage includes progressively accumulating different types of awards within one award opportunity.

Another advantage of the present invention is to provide more award opportunities to players to increase player excitement and entertainment.

Other objects, features and advantages of the invention will be apparent from the following detailed disclosure, taken in conjunction with the accompanied sheets and drawings, wherein like numerals refer to like parts, elements, components, steps and processes.

BRIEF DESCRIPTION OF THE FIGURES

FIG. 11 is a table illustrating a plurality of games having average expected values corresponding to ranges of average expected values for accumulated award opportunities.

DETAILED DESCRIPTION OF THE INVENTION

Gaming Device and Electronics

Figure 1A:
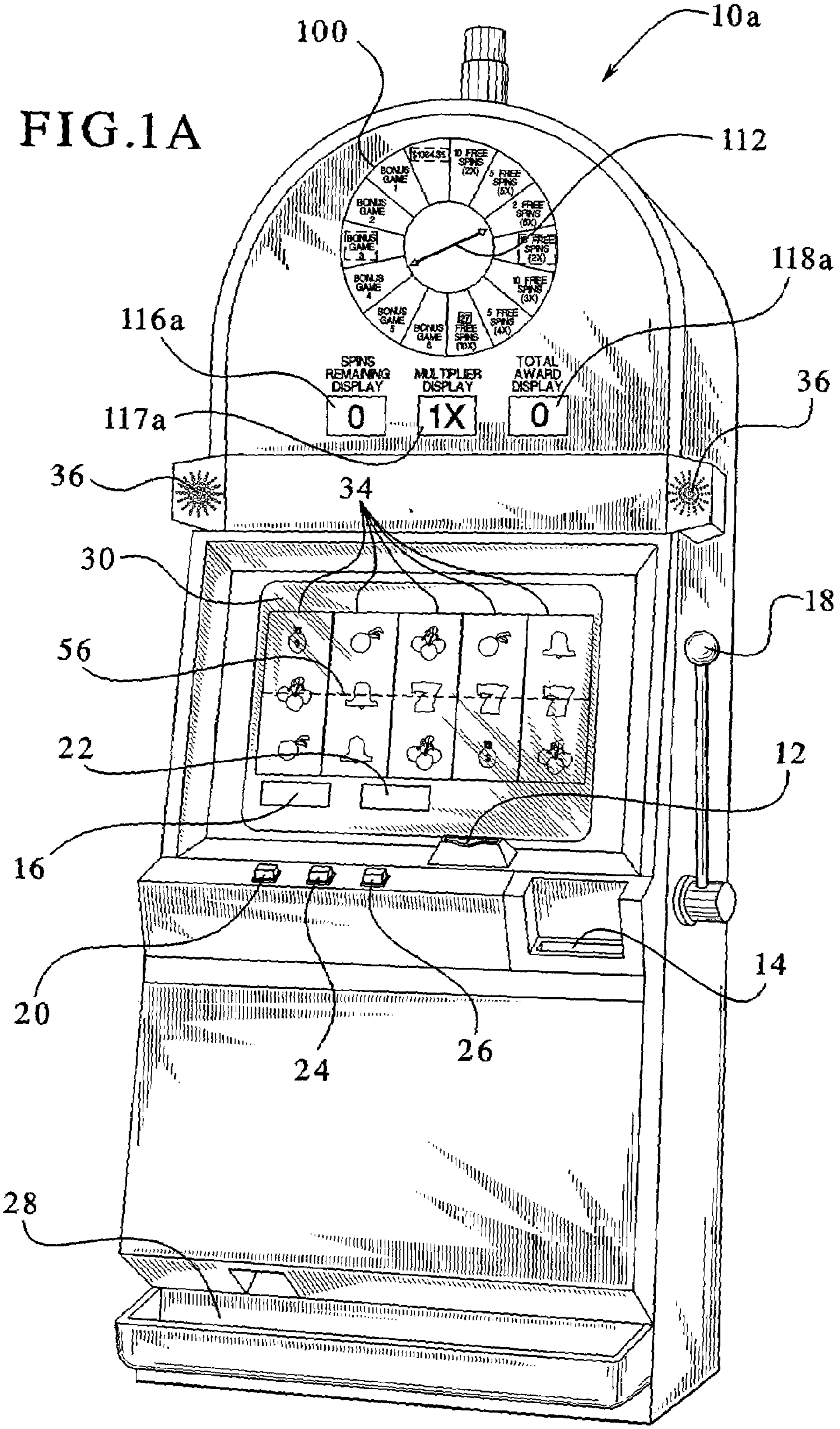
FIG. 1A is a front perspective view of one embodiment of the gaming device of the present invention.
Figure 1B:
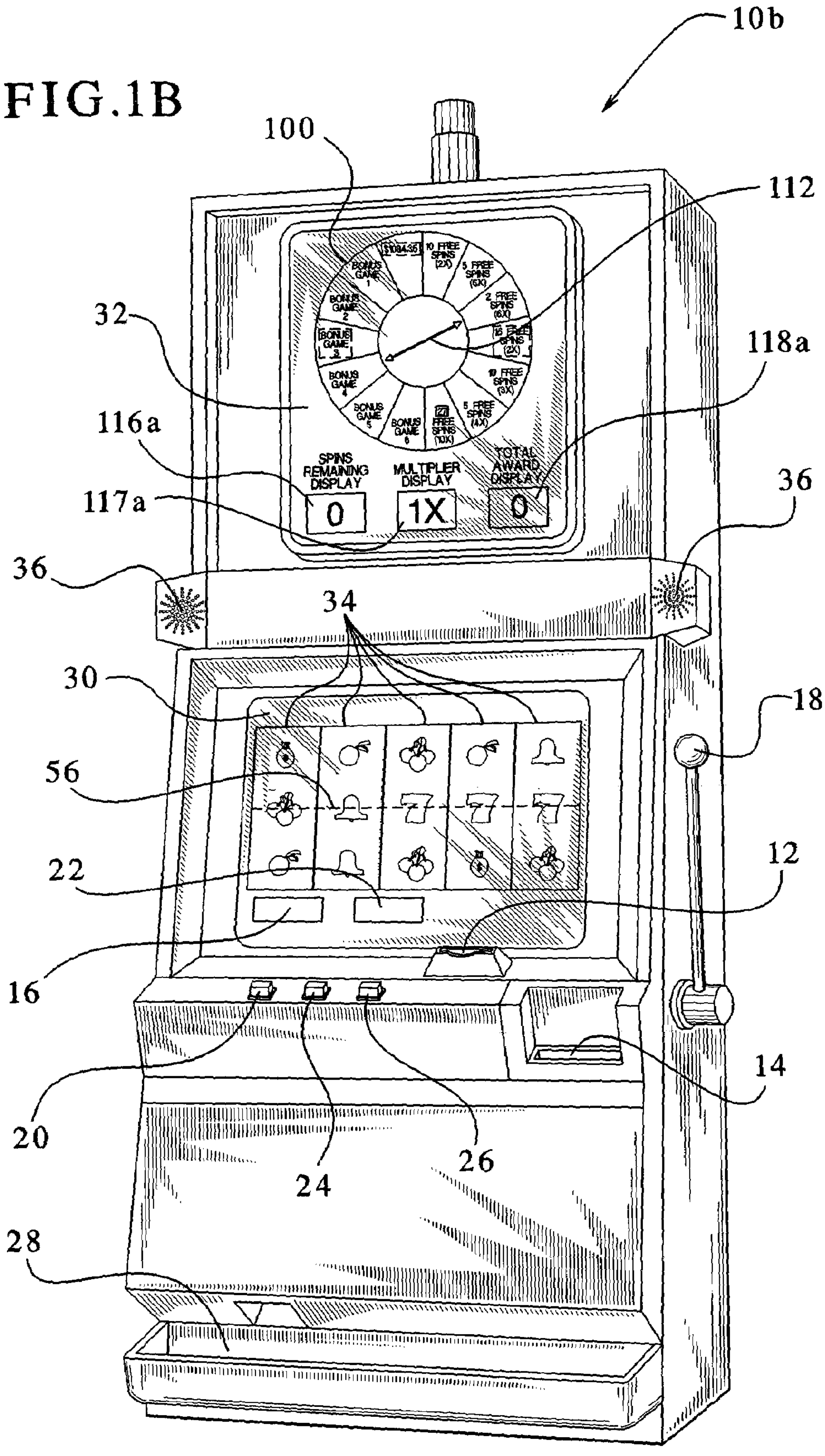
FIG. 1B is a front perspective of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30 and a mechanical wheel 100, and the alternative embodiment shown in FIG. 1B includes a central display device 30 as well as an upper display device 32, which includes a video image of the wheel 100. Gaming device 10 in one embodiment displays a plurality of reels 34 such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
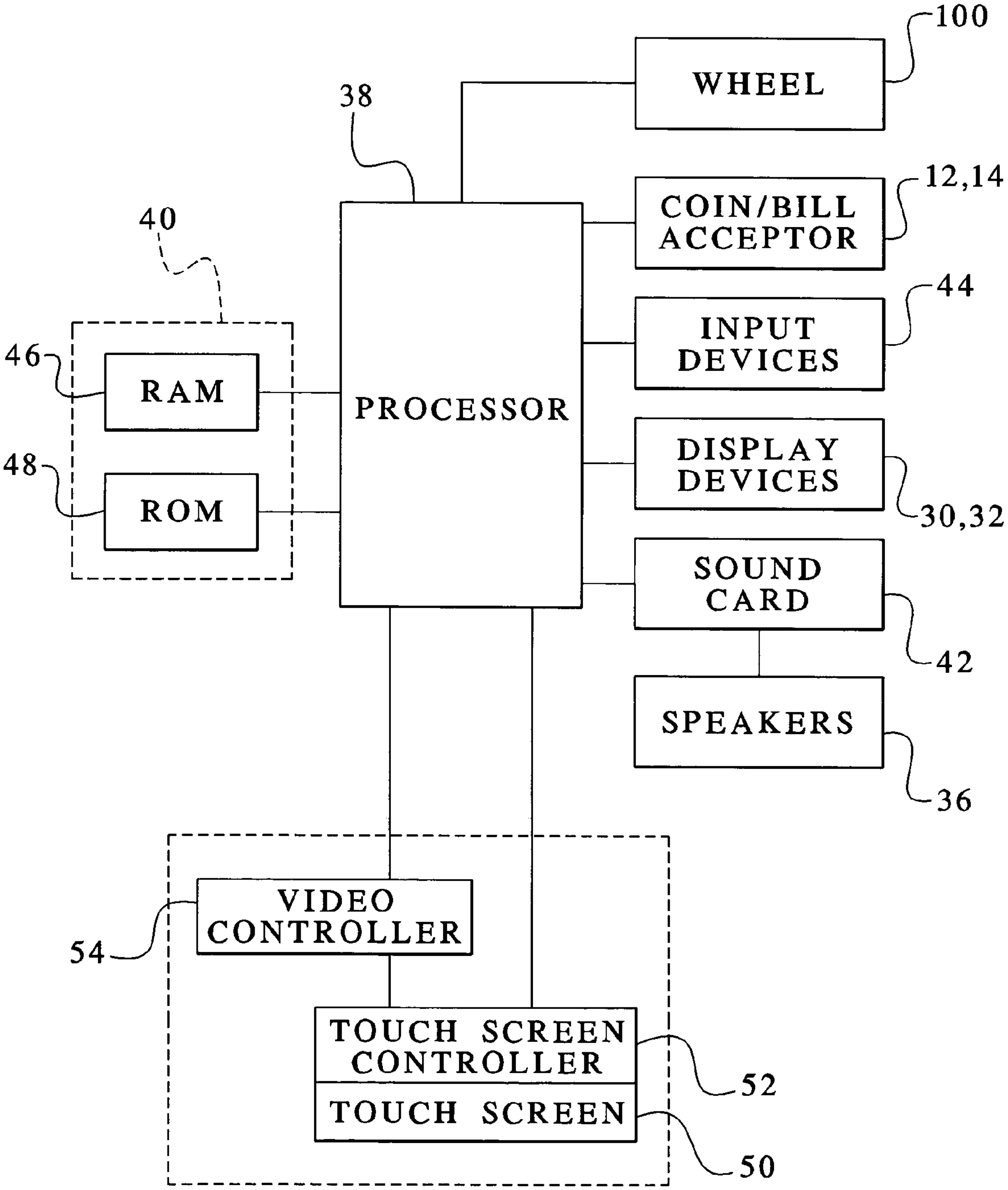
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a wheel 100; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically initiate a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Game

In one embodiment of the present invention, if a player achieves a bonus triggering or qualifying condition during the primary game, the gaming device 10 initiates the secondary or bonus game of the present invention.

The bonus game of the present invention includes a game having multiple player selectable award opportunities. The award opportunities may be any suitable award opportunities including but not limited to bonus games, predetermined awards, randomly determined awards, progressive awards, progressive numbers of free spins, free spins or free games in a primary game, free spins or free games in bonus game, or modifiers such as multipliers. In one presently preferred embodiment, the award opportunities are grouped or divided into groups of related award opportunities. Each group may include one or more of the related award opportunities and the award opportunities are related in any suitable manner. The award opportunities may provide predetermined or randomly determined outcomes. The outcomes may include awards, values, free spins, free games, progressive awards, progressive numbers of free spins, modifiers such as multipliers or credits. It should be appreciated that the outcomes do not have to be associated with an award or value. Accordingly, some of the outcomes do not have a value or produce a zero value.

In one embodiment, the award opportunities are grouped into pairs of related award opportunities where at least one outcome is associated with each award opportunity. An indicator indicates one of the groups of related award opportunities. A player then chooses or picks one of the award opportunities in the indicated group and receives the outcome associated with the picked award opportunity. The outcome may be an award such as a value or credit, or no award or value.

In one embodiment, the indicator simultaneously indicates pairs of related award opportunities. In one embodiment, the related award opportunities are positioned opposite to each other. In another embodiment, the related award opportunities are positioned adjacent to each other. An indicator simultaneously indicates one of the related pairs of award opportunities. In another embodiment, separate indicators independently indicate the pair of related award opportunities. After one of the pairs of award opportunities are indicated by the indicator, the player chooses one of the two award opportunities in the indicated pair of award opportunities. Then the player receives the outcome associated with or which results from the indicated award opportunity picked by the player.

In the presently preferred embodiment, the outcomes with result from the indicated award opportunities include an expected value or values. The expected value of the outcome varies and depends on the type of award opportunity which produces the particular outcome. In one embodiment, the average expected values of the outcomes which result from the indicated award opportunities are approximately equal. Therefore, the player will receive approximately the same expected value for either of the outcomes associated with the indicated award opportunities regardless of which award opportunity is picked by the player.

In another embodiment, the average expected values of the outcomes which result from the indicated award opportunities are different. In this embodiment, the player chooses one of the award opportunities from the indicated pair of award opportunities. If the picked award opportunity includes a greater average expected value that the non-picked award opportunity, the gaming device provides the value associated with the picked award opportunity. If the unpicked award opportunity includes the greater average expected value (i.e., an incorrect choice), the amount of the difference between the average expected values is credited or transferred to a progressive jackpot or award. The progressive jackpot or award increases until the gaming device indicates the progressive award symbol.

In a further embodiment, the processor selects a bonus event such as a bonus game associated with an indicated pair of award opportunities based on a probability of being selected by the processor associated with each award opportunity. In one embodiment, the processor selects one bonus game from a group of bonus games based on the probabilities. In another embodiment, the processor selects the bonus game from at least two groups of bonus games, where a probability of being indicated is associated with each of the bonus games in the groups. In a further embodiment, the probabilities associated with the bonus games in the groups change after each selection in an indicated group by the player. In another embodiment, the probabilities associated with the bonus games in the groups change after a plurality of selections from the groups. It should be appreciated that the indicated bonus game may be selected from one or more groups of bonus games based on the probabilities.

In one embodiment, the expected values of the outcomes which result from the indicated award opportunities vary based on the desires of the game implementor. Thus, a probability of being indicated by the indicator is associated with each of the pairs of award opportunities. In one embodiment, one pair of award opportunities includes outcomes which have higher average expected values than another pair or pairs of award opportunities. In this embodiment, the probability of being indicated associated with that pair of award opportunities having the greater average expected value is higher than the probability of being indicated associated with the other pairs of award opportunities. In another embodiment, the probability of being indicated associated with the award opportunities vary inversely with the average expected values of the outcomes associated with the award opportunities. Therefore, the greater the average expected values of the outcomes associated with the award opportunities, the lower the probabilities of being indicated associated with those award opportunities.

In one alternative embodiment, the award opportunities are arranged in two separate groups such as columns. The groups or columns include several sections wherein each section includes an award opportunity. The award opportunities are preferably related such that the sections including related award opportunities are positioned opposite to each other in the columns or groups. An indicator is positioned between the groups or columns and simultaneously indicates one of the sections in each of the groups or columns. It should be appreciated that the pairs of award opportunities may be related in any suitable manner.

In another alternative embodiment, the present invention is employed in a primary game, where the award opportunities are a plurality of bonus events or bonus games. The bonus games or award opportunities are related such that pairs of related bonus games are positioned opposite to each other. An indicator simultaneously indicates one of the pairs of bonus events or games. The player then picks one of the bonus games in the pair of indicated bonus games. The bonus game picked by the player is initiated and the player receives the outcome associated with that bonus game. In one embodiment, the average expected values of the outcomes associated with the bonus games are approximately equal. Therefore, the player will receive approximately the same average value from the bonus games regardless of which bonus game is picked by the player.

Figure 3:
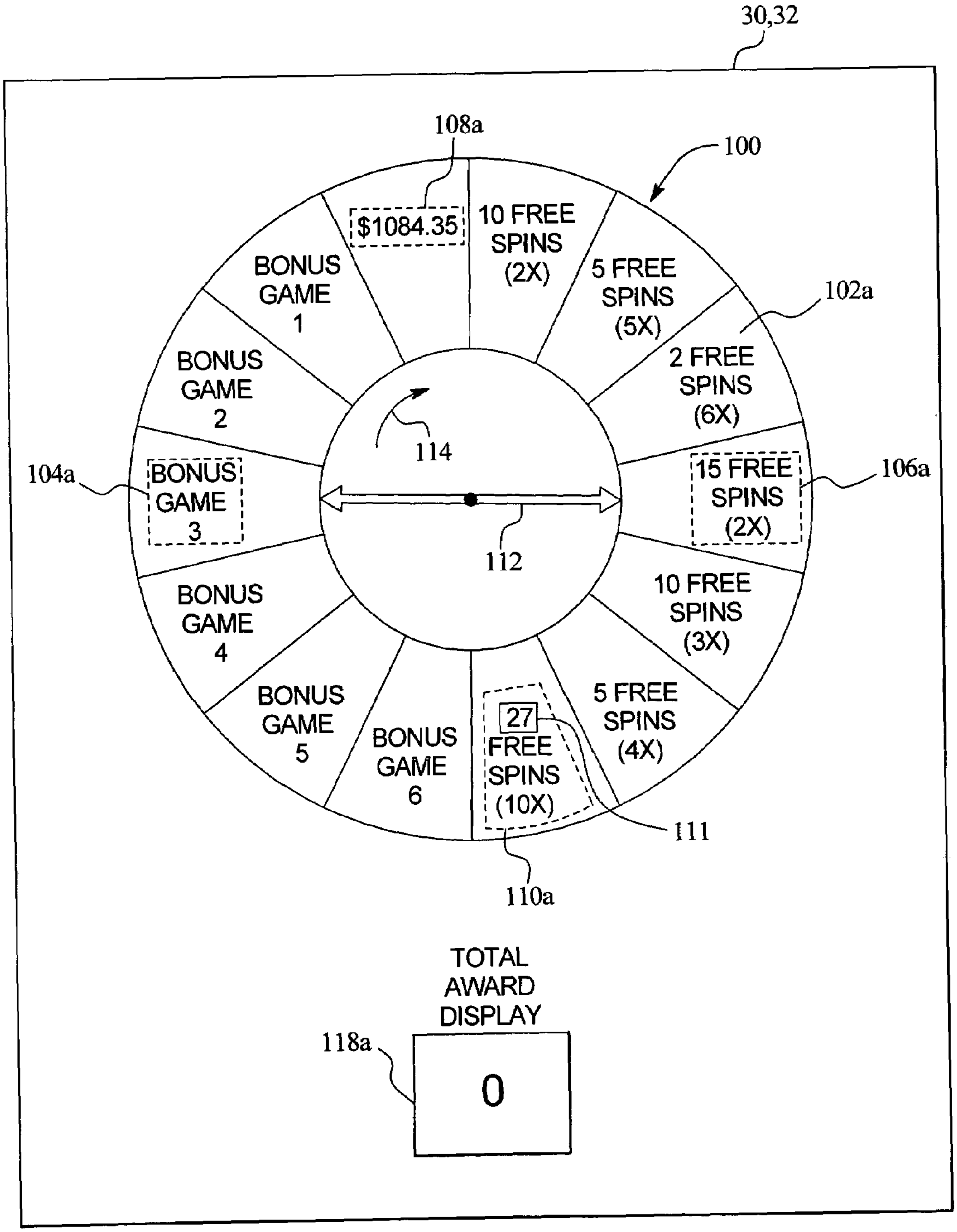
FIG. 3 is an enlarged front elevation view of one of the display devices of FIGS. 1A and 1B illustrating one embodiment of the present invention.

Referring now to FIG. 3, one embodiment of the present invention is illustrated where the bonus game includes a wheel 100 having a plurality of sections 102*a*. A plurality of groups of award opportunities are associated with the sections 102*a* on the wheel. The groups of award opportunities are positioned on the wheel so that related award opportunities in the groups are positioned opposite to each other on the wheel. An indicator 112 indicates one of the groups or pairs of related award opportunities in each spin.

In the illustrated embodiment, the award opportunities include a plurality of bonus game symbols 104*a* and a plurality of opportunities in a sub-game such as a subsequent bonus game. Additionally, one of the award opportunities includes a progressive award 108*a* and another of the award opportunities 110*a* associated with the sub-game includes a progressive number of free spins 111 and a multiplier.

An indicator 112 is rotatably connected to the gaming device in the center of the wheel 100. The indicator 112 rotates in a clockwise direction as indicated by arrow 114 and simultaneously indicates two award opportunities or one pair of award opportunities associated with the sections 102*a* on the wheel. In this embodiment, the indicator 112 is a single indicator that simultaneously indicates two of the sections on the wheel. The indicator 112 may rotate in a clockwise direction, counter-clockwise direction, or any combination of clockwise and counter-clockwise directions. Also, in this embodiment the wheel 100 remains stationary while the indicator 112 rotates to indicate sections on the wheel. In another embodiment, the indicator 112 remains stationary while the wheel 100 rotates. It should be appreciated that the wheel may rotate, the indicator may rotate, or both the wheel and indicator may rotate in the same direction or in different directions. A total award display 118*a* indicates the total award accumulated by the player in the bonus game. The award indicated in the total award display at the end of the bonus game is the award provided to the player.

Referring to FIG. 3, the award opportunities including bonus game symbols 104*a* are positioned opposite to the award opportunities including opportunities in the sub-game 106*a*. Thus, the indicator 112 indicates one bonus event or bonus game symbol 104*a* and one of the opportunities in the sub-game 106*a*. It should be appreciated that the award opportunities may be positioned in any suitable manner desired by the game implementor. In one embodiment described above, the average expected values of the outcomes which result from the indicated award opportunities are equal or approximately equal.

For example, the average expected value of the outcome which results from the award opportunity including the progressive award 108*a* is approximately equal to the average expected value of the outcome which results from the award opportunity having the opportunity in the sub-game 110*a*. Therefore, if the player picks the indicated progressive award 108*a*, the player receives the outcome from that award which is the progressive award value of $1,084.35. If the player picks the opportunity in the sub-game 110*a*, the player receives a progressive number of free spins 111 (i.e., 27 free spins) and a "10×" multiplier to be used by the player in the sub-game. The player then uses the free spins and multiplier in the sub-game to obtain an outcome from the sub-game. The outcome may be any suitable award or no award. However, since the average expected value of the outcome from the sub-game is approximately equal to the outcome from the progressive award (i.e., $1,084.35), the average expected value of the outcome which results from the sub-game is approximately equal to $1,084.35. As a result, the player receives approximately the same average expected value regardless of which indicated award opportunity the player picks in the bonus event. Preferably, the player does not know that the average expected values of the outcomes which result from the indicated award opportunities are approximately equal.

Referring to FIG. 3, if the player chooses the award opportunity including the bonus game symbol, the gaming device initiates the bonus event or game associated with that symbol. The player plays the bonus event or bonus game and receives the value of the outcome which results from that bonus event. If the player picks the award opportunity including the opportunity in the sub-game 106*a*, the player obtains the outcome which results from the sub-game. In this particular embodiment, the player receives a number of free spins and a multiplier to use in the sub-game. The player receives the value of the outcome, if any, which results from using the free spins and the multiplier in the sub-game.

Figure 4:
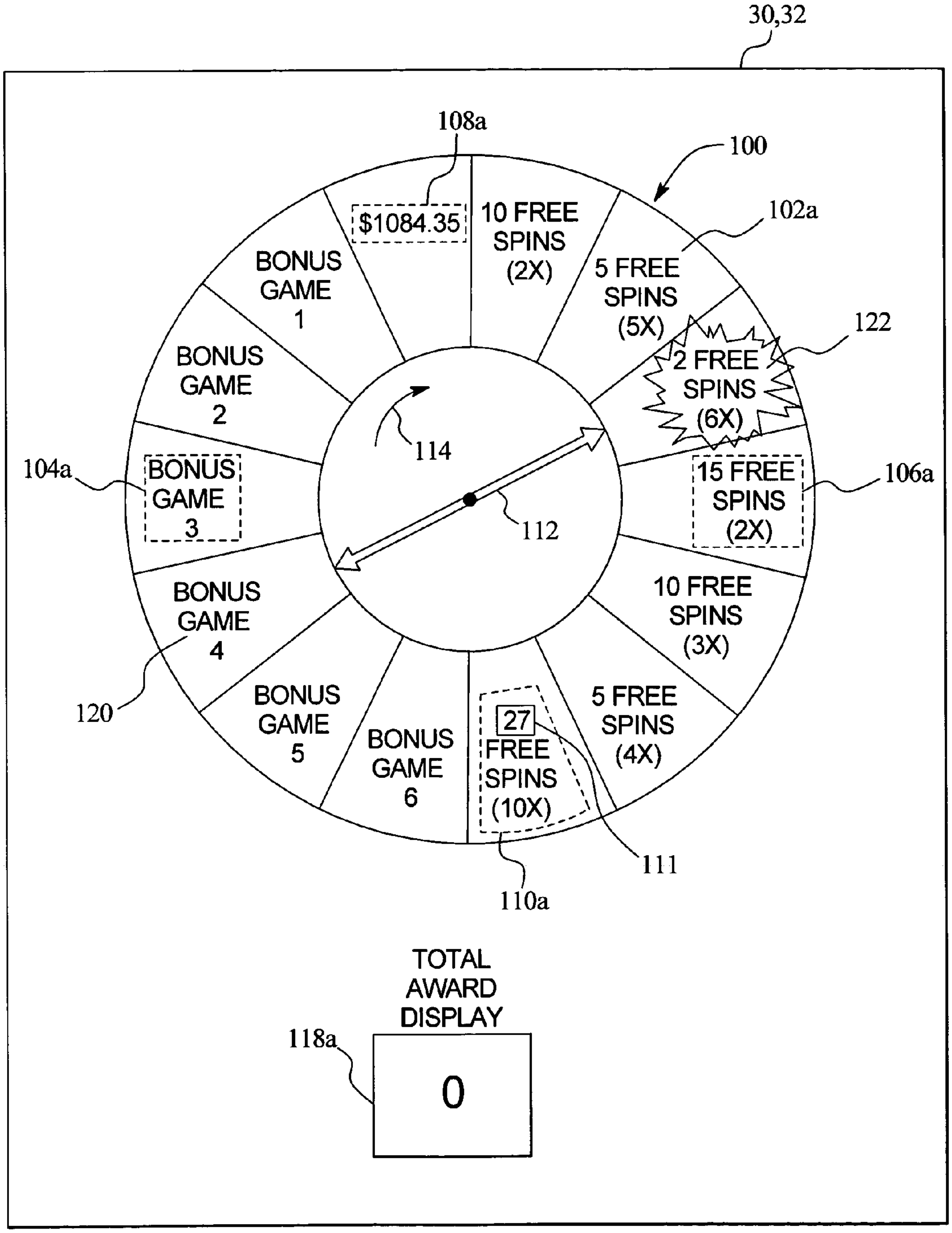
FIG. 4 is an enlarged front elevation view of one of the display devices of FIGS. 1A and 1B illustrating an example of the embodiment of FIG. 3 where two award opportunities are indicated on the wheel.

Referring now to FIG. 4, an example of the embodiment of FIG. 3 is illustrated where the bonus event or bonus game is initiated or triggered from the primary game. In FIG. 4, the gaming device or the player spins the indicator 112 to indicate sections on the wheel 100. The indicator stops and simultaneously indicates two related award opportunities in one of the groups of award opportunities. One of the indicated award opportunities in the group includes a bonus game symbol which initiates BONUS GAME 4 (120) if the player picks this award opportunity. The other indicated award opportunity in the group provides an opportunity in a sub-game. Specifically, the gaming device provides two free spins and a "6×" multiplier for the player to use in the sub-game. The player uses the spins and multiplier in the sub-game to obtain an outcome from the sub-game. In FIG. 4, the player picks the award opportunity 122, which provides the player with an opportunity in the sub-game. In this example, the award opportunity 122 initiates a sub-game where the player uses the two free spins and "6×" to obtain an outcome which results from the sub-game.

Figure 5A:
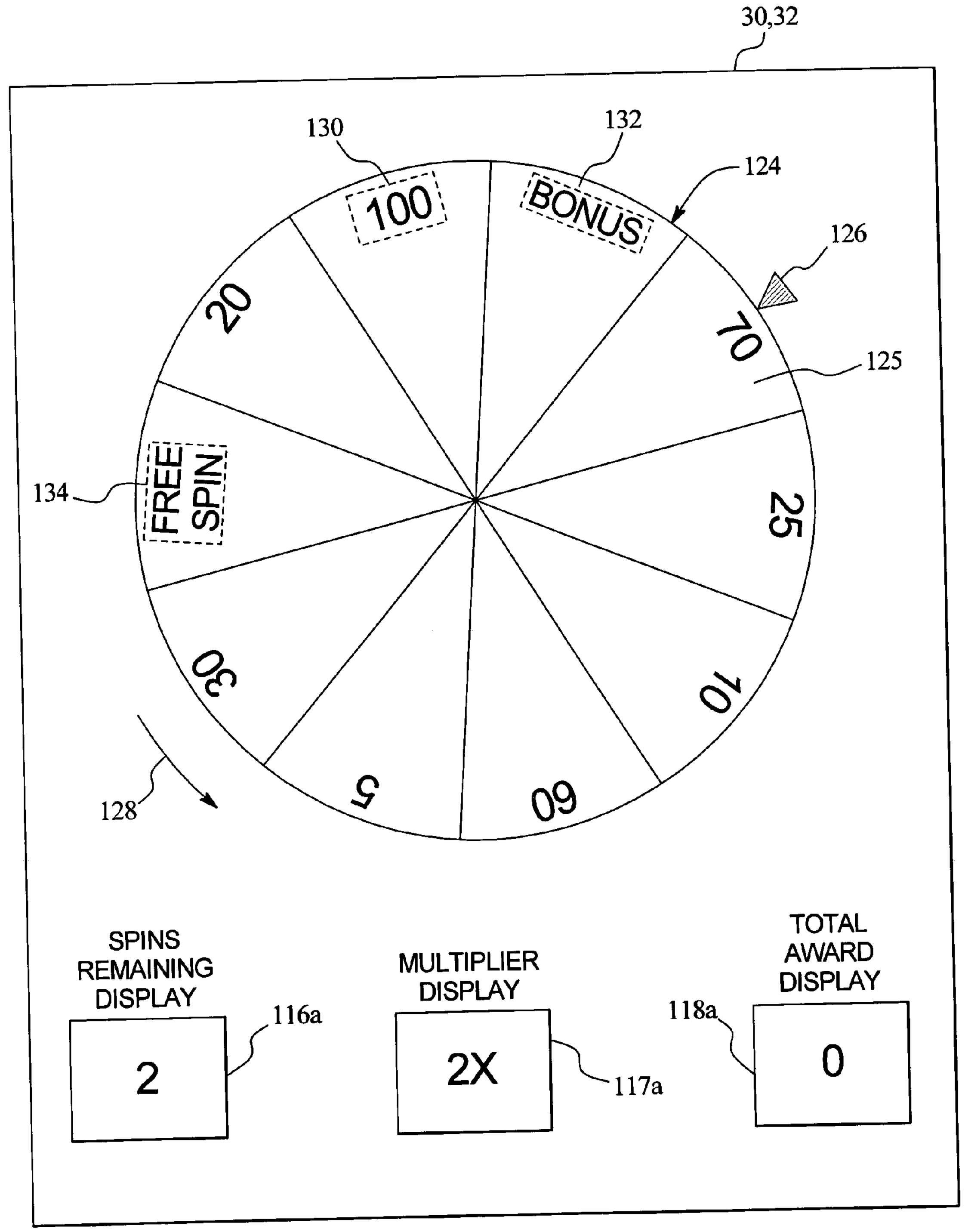
FIGS. 5A and 5B are enlarged front elevation views of one of the display devices of FIGS. 1A and 1B illustrating two different bonus events which may be initiated when the player chooses one of the indicated award opportunities in FIG. 4.

Referring to FIG. 5A, the sub-game is illustrated where the player receives the two free spins as indicated in the spins remaining display 116*a* and the "2×" multiplier as indicated by the multiplier display 117*a*. The gaming device displays a wheel 124 including a plurality of sections 125. The sections on the wheel include award symbols 130, a bonus symbol 132, and a free spin symbol 134. A plurality of awards are associated with the award symbols 130. An indicator 126 indicates sections on the wheel 124. In this embodiment, the wheel 124 spins in a counter-clockwise direction as indicated by arrow 128. The player uses the free spins to spin the wheel 124 and obtain an outcome. The indicated awards in each spin are multiplied by the multiplier indicated in multiplier display 117*a*. The multiplied award is then transferred to the total award display 118*a*. The player spins the wheel 124 until the player does not have any-spins remaining in the game. The player then receives the total award indicated in the total award display 118*a* as the outcome for picking the award symbol 122 in FIG. 4. It should be appreciated that the sub-game may be any suitable game.

Figure 5B:
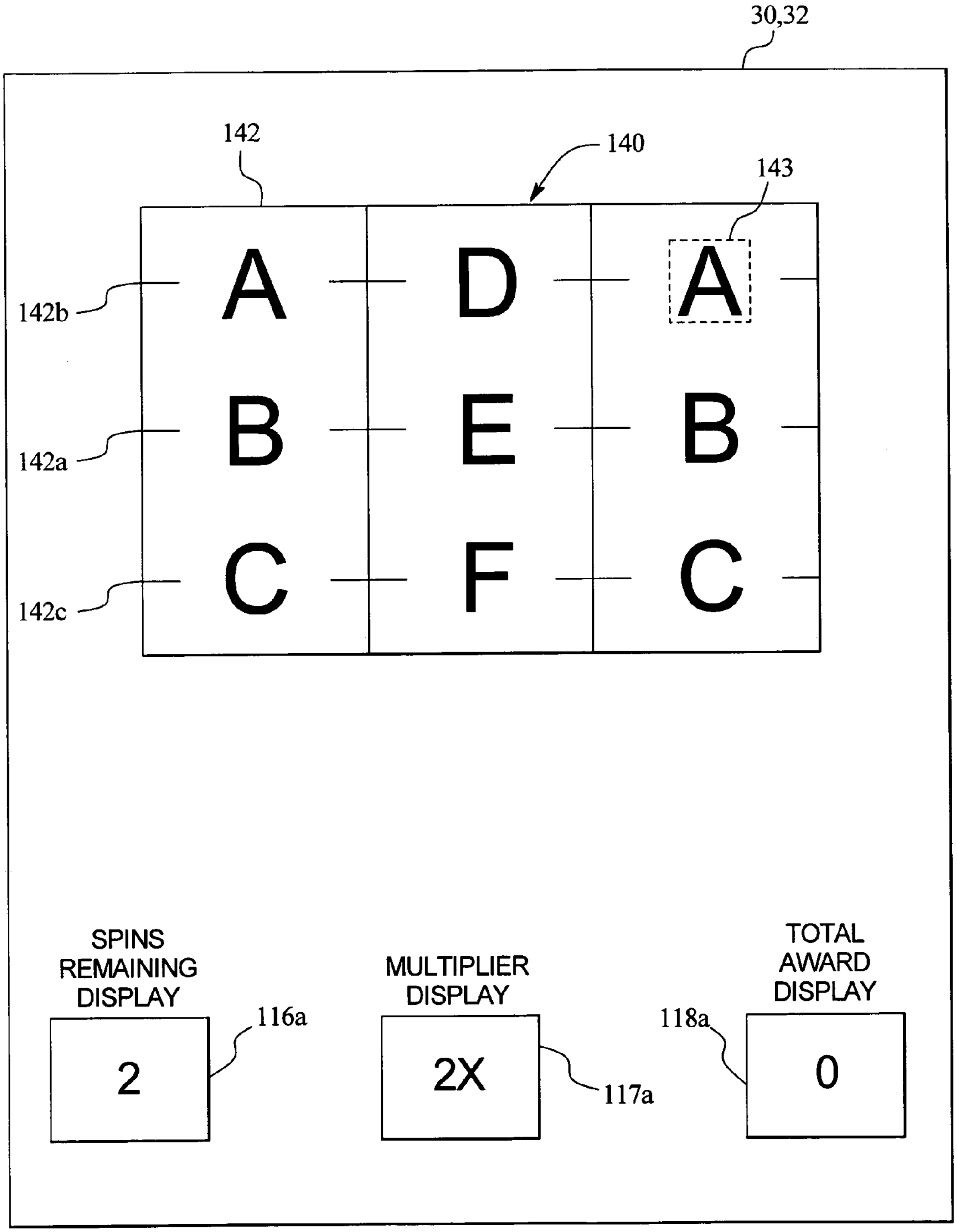

Referring to FIG. 5B, another example of a sub-game is illustrated where the sub-game includes a plurality of reels 142 that are displayed to the player. The reels include award symbols 143. In addition, three paylines 142*a*, 142*b* and 142*e* are associated with the reels. The spins obtained by the player for picking the award symbol 122 in FIG. 4 are indicated in the spins remaining display 116*a*. Similarly, the multiplier associated with the award symbol 122 is displayed in multiplier display 117*a*. In this example, the player spins the reels 142 and obtains an award in each spin. The awards are based on winning combinations of symbols indicated on the reels. Any awards obtained by the player are multiplied by the multiplier indicated in multiplier display 117*a* and then added or transferred to the total award display 118*a*. The player spins the reels for the number of spins indicated in the spins remaining display 116*a*. When the player does not have any spins remaining, the player receives the total award indicated in the total award display 118*a*. Therefore, in FIGS. 5A and 5B, the player receives an outcome, which may be any suitable value or no value, and returns to the primary game.

Figure 6:
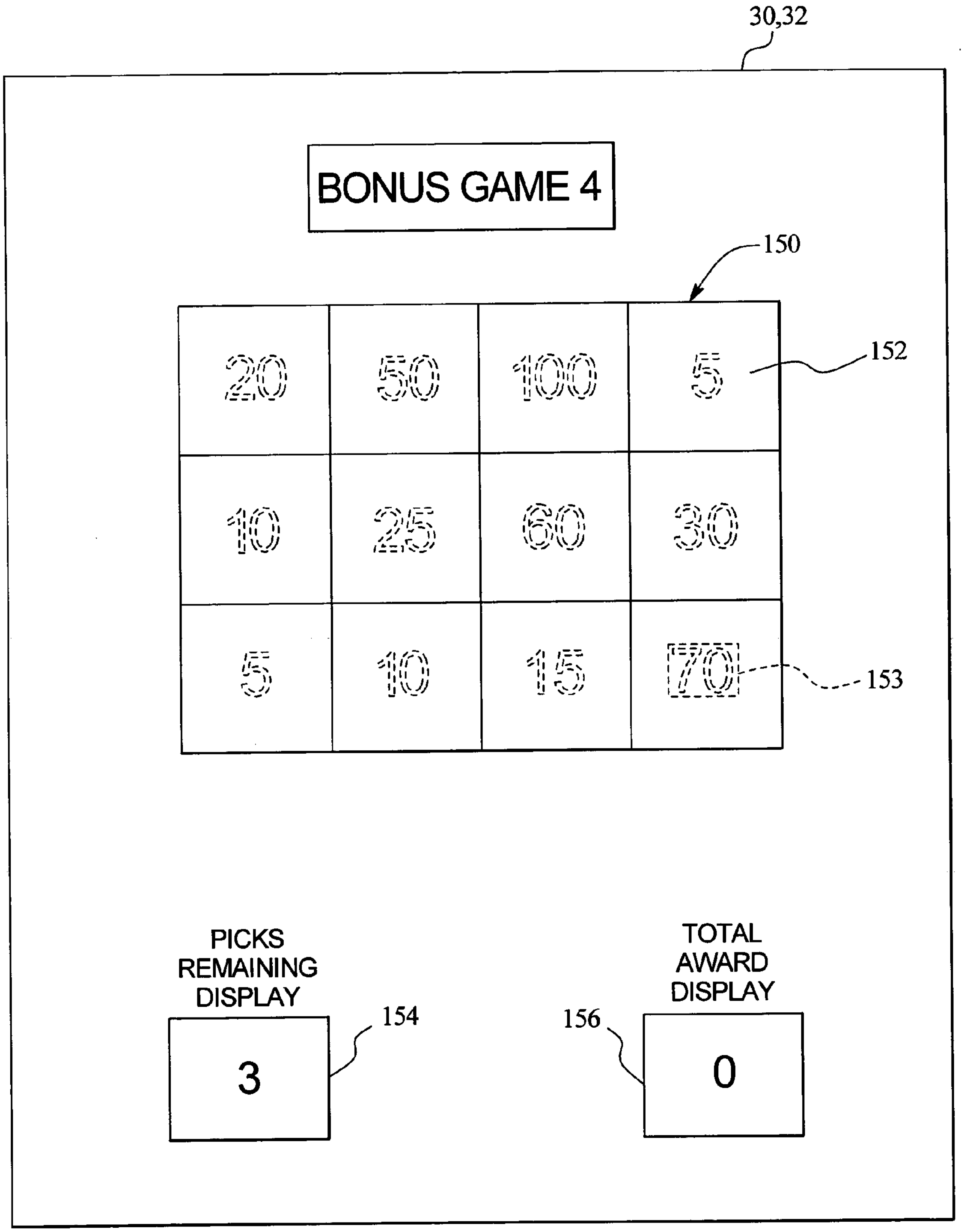
FIG. 6 is an enlarged front elevation view of one of the display devices of FIGS. 1A and 1B illustrating one embodiment of a bonus event such as a bonus game that is initiated when the player chooses the other indicated award opportunity in FIG. 4.

Referring back to FIG. 4, if the player picks the indicated award opportunity that includes the bonus game symbol referring to BONUS GAME 4 (120), the picked bonus game is initiated by the gaming device. In FIG. 6, BONUS GAME 4 is displayed to the player when the player picks the indicated award opportunity having the bonus game symbol 120. It should be appreciated that BONUS GAME 4 may be any type of bonus game desired by the game implementor. In this example, BONUS GAME 4 is a bonus game that displays a plurality of selections 150 to the player. Each selection 152 in the plurality of selections 150 includes an award 153. The awards 153 are initially masked or hidden from the player. Once the player picks a selection 152, the associated award 153 is revealed and provided to the player. The player may be provided with one or more picks from the plurality of selections as indicated by the picks remaining display 154. The player picks selections from the plurality of selections 150 until the player does not have any picks remaining. The player then receives the total accumulated award as indicated in the total award display 156. The total award or outcome which results from BONUS GAME 4 is provided to the player and the player returns to the primary game.

As described above, the average expected value of the outcomes associated with the award opportunities are approximately equal. Thus, in FIG. 4, the outcomes which result from the award opportunity in the sub-game 122 and the BONUS GAME 4 (120) are approximately equal. If the player receives an outcome having a value of one hundred by selecting the award symbol 122, then the average expected value of the outcome which results from the bonus game associated with the bonus game symbol 120 will be approximately equal to one hundred. In another embodiment the outcomes which result from the award opportunities produce different average expected values.

In one embodiment, the award opportunities are associated with a probability of being indicated by the indicator 112. Therefore, the probability of one group or pair of award opportunities being indicated by the indicator 112 is greater than another group or pair of award opportunities being indicated by the indicator. In another embodiment, the award opportunities which produce outcomes with greater average expected values such as the progressive award and the award opportunity having the progressive number of free spins, are associated with probabilities of being indicated. In this embodiment, the probability of the award opportunities which produce outcomes with greater average expected values, such as the progressive award and the award opportunity having the progressive number of free spins, being indicated is less than the probability of any other group or pair of award opportunities being indicated by the indicator.

Figure 7:
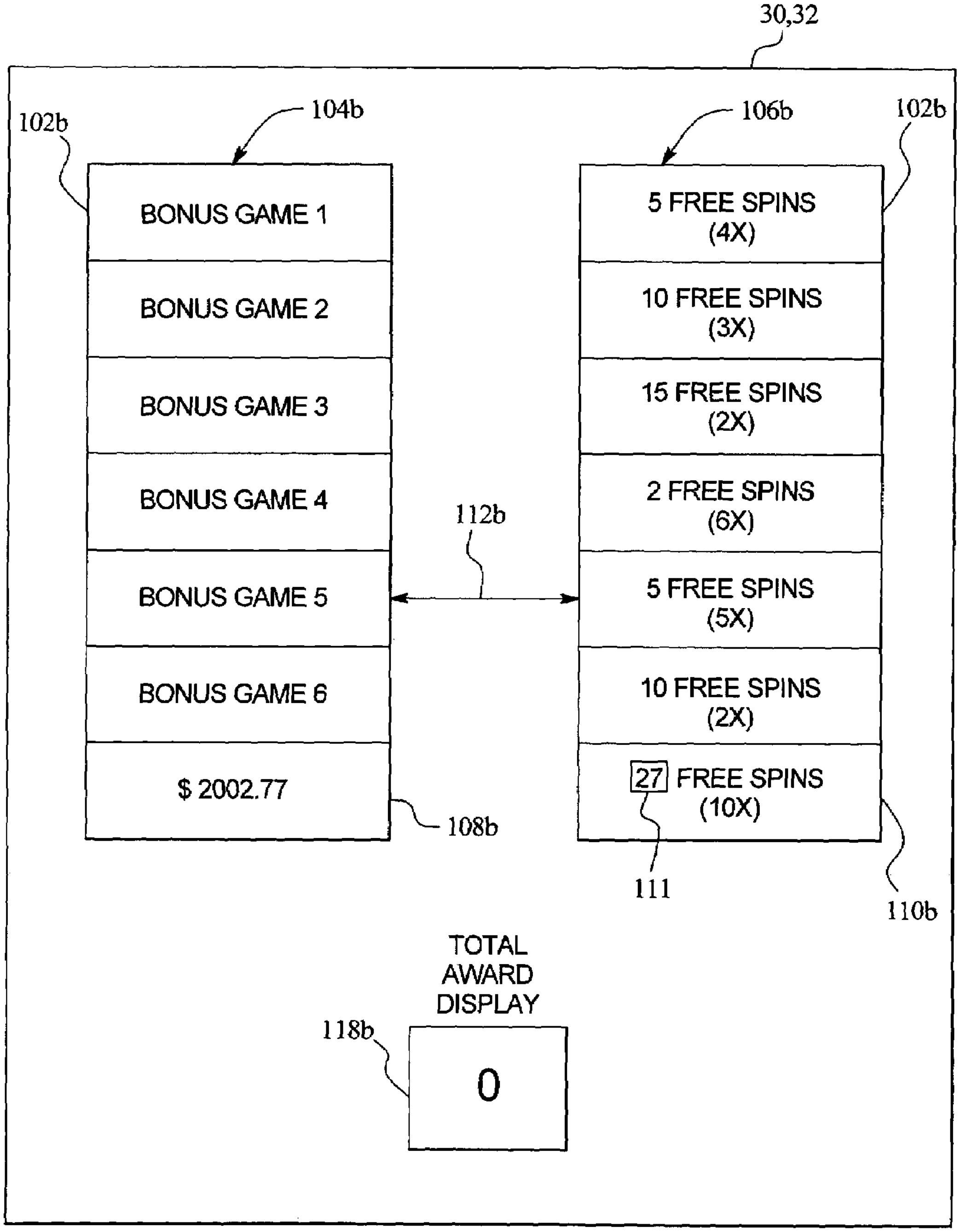
FIG. 7 is an enlarged front elevation view of one of the display devices of FIGS. 1A and 1B illustrating an alternative embodiment of the present invention.

Referring now to FIG. 7, an alternative embodiment of the present invention is illustrated where the bonus game includes groups of award opportunities positioned in two columns 104*b* and 106*b* having several sections 102*b*. In column 104*b*, the sections 102*b* include several award opportunities wherein each award opportunity in column 104*b* produces an outcome based on a particular bonus game. Additionally, a progressive award 108*b* is associated with one of the sections in column 104*b*. In column 106*b*, several award opportunities 110*b* are associated with the sections 102*b*. Each award opportunity 110*b* in column 106*b* produces an outcome that is based on an opportunity in a sub-game. The player receives a number of free spins and a multiplier to use in the sub-game. One number of free spins is a progressive number of free spins 111. It should be appreciated that the outcomes may be based on any type of awards or games as desired by the game implementor. Each of the groups of related award opportunities includes one of the award opportunities in column 104*b* and one of the award opportunities in column 106*b*.

In FIG. 7, the indicator 112*b* simultaneously indicates one group which includes one of the sections in column 104*b* and one of the sections in 106*b*. In another embodiment, one or more indicators 112*b* separately indicate one of the groups including sections in columns 104*b* and 106*b*. The sections may be indicated simultaneously or at different times in the game as long as the player is able to choose from at least two related award opportunities in one or more of the groups. The total award display 118*b* indicates the total value of the outcomes which result from the award opportunity picked by the player in the game. The player obtains or receives the total award displayed in the total award display 118*b* when the game ends.

In an alternative embodiment, the present invention is employed as a primary game in a gaming device. In one embodiment of a primary game, a limited number of groups of award opportunities are displayed to the player. In this embodiment, the player may or may not obtain an award in the primary game. The award opportunities include several pairs of bonus games. The indicator indicates one group of award opportunities or two of the related bonus games. Then, the player picks one of the bonus games in the indicated group to receive the outcome, if any, associated with the picked bonus game. In a further alternative embodiment, a probability of being indicated is associated with the groups of award opportunities such that the probability of one group or pair of award opportunities having bonus games being indicated is less than the probabilities of other groups or pairs of award opportunities being indicated.

Component Accumulator Game

Figure 8A:
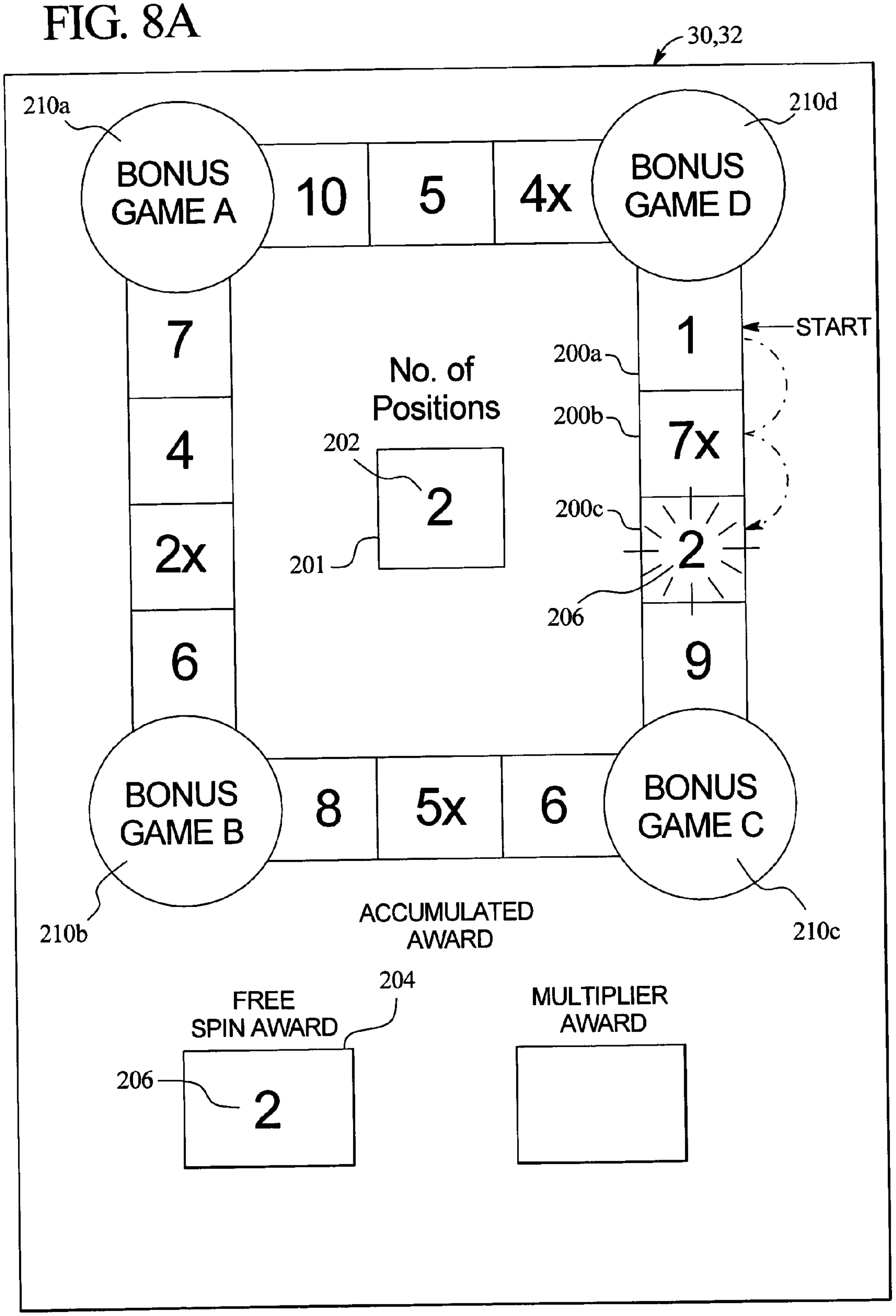
FIGS. 8A, 8B and 8C are enlarged front elevation views of an alternative display device of the present invention illustrating the arrangement of positions in an embodiment and the award opportunities associated with each position.
Figure 8B:
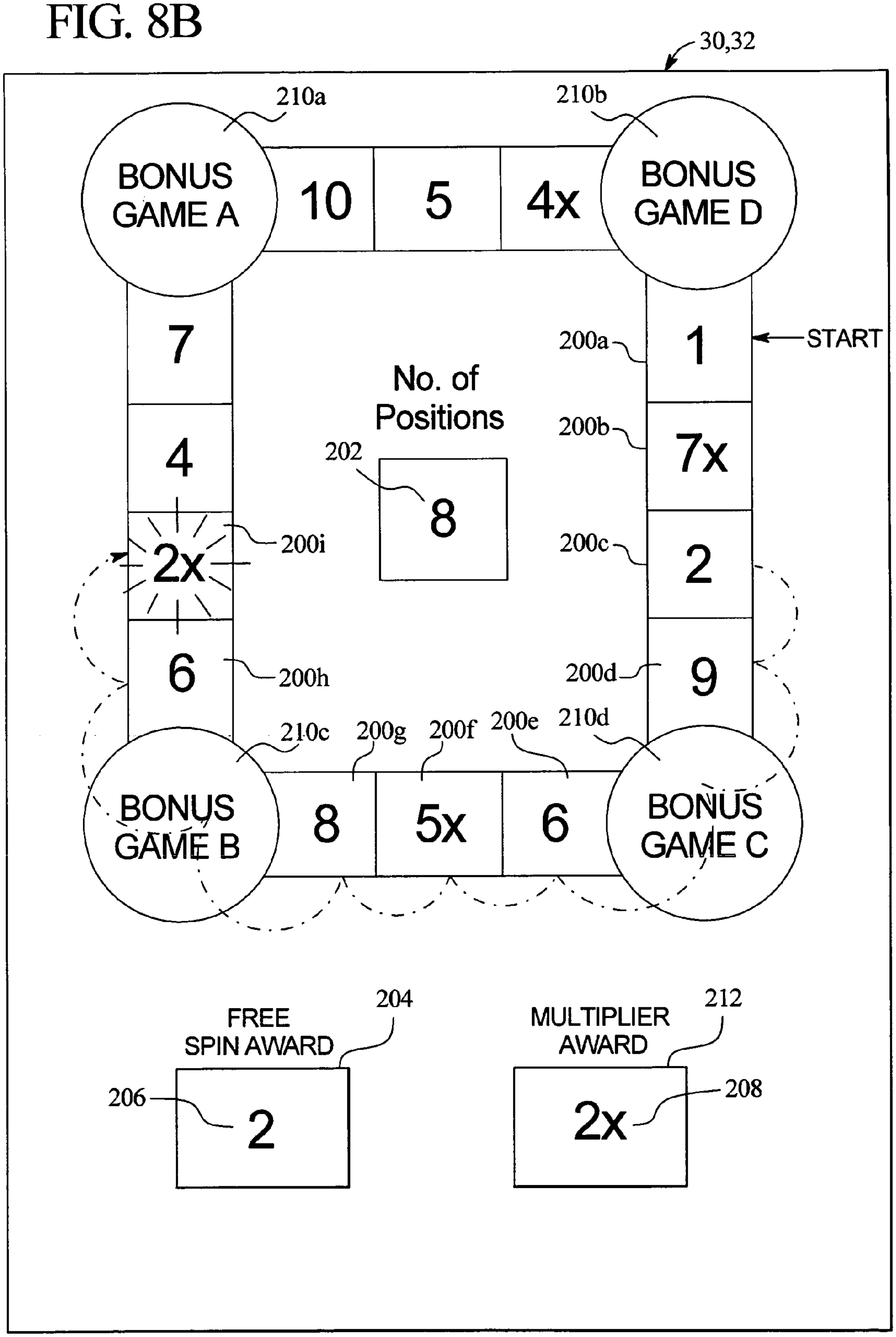
Figure 8C:
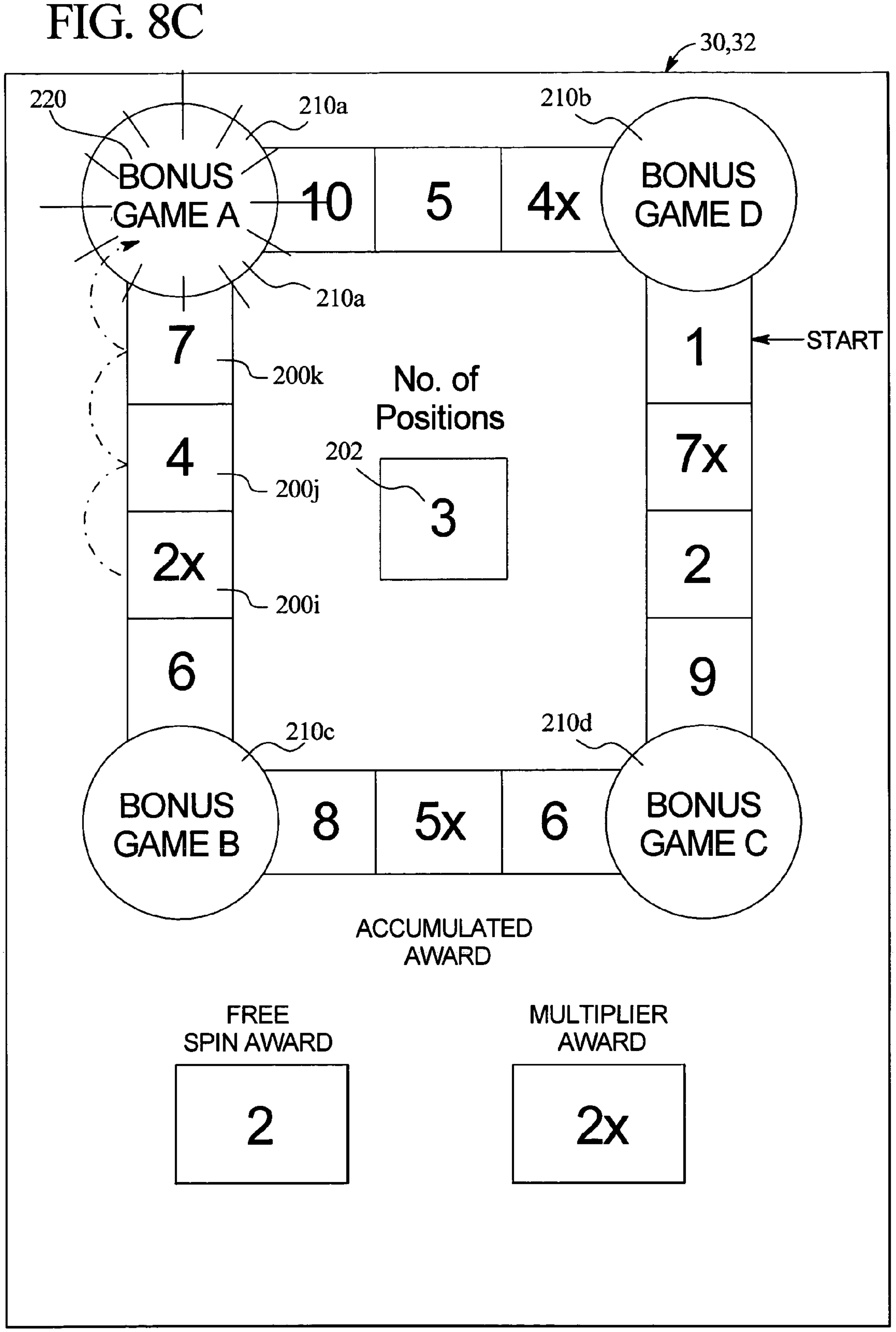

Referring now to FIGS. 8A to 8C, an alternative embodiment of the present invention enables the player to accumulate components of an award opportunity until the game presents the accumulated award opportunity 200 along with at least one other award opportunity to be selected by the game or, in one embodiment, by the player. It should be appreciated that any suitable structure or mechanism, including reels or wheels, can be used to accumulate the components of an award opportunity.

In the example of one embodiment illustrated in FIGS. 8A to 8C, the gaming device displays a plurality of fixed positions including component-accumulating positions and selection positions randomly indicated by the gaming device. The components of the accumulated award opportunities are associated with the component-accumulating positions. The components of the accumulated award opportunities in one embodiment include components of different types of awards or outcomes. In one embodiment, different types of award opportunities are associated with each component-accumulating position. In the illustrated example described below, the components of a single accumulated award opportunity include free spins or activations and a multiplier, each associated with different component-accumulating positions.

In one embodiment, the gaming device randomly generates or selects one of the positions by determining the number of positions a player symbol or indicator must traverse to move to the indicated component-accumulating position or selection position. In FIGS. 8A to 8C, the number of positions to be moved by the player indicator is indicated in the Number of Positions display 201. In the example illustrated in FIG. 8A, the gaming device randomly determines that the player move two positions 202. The player indicator begins at the start position 200*a* and moves in a clockwise direction through component-accumulating position 200*b* to arrive at position 200*c*. It should be appreciated that the movement can be in either direction as designated by the gaming device.

When the gaming device indicates a component-accumulating position, the gaming device combines by a mathematical operation the component or components associated with said position with any other accumulated components. It should be appreciated that different types of components can be combined such as increasing the free spin of the component by the multiplier component 208. The component associated with the component-accumulating position 200*c*, in this embodiment, adds two free spins 206 to the accumulated award opportunity displayed in the free spin award display.

In FIG. 8B, the gaming device randomly determines that the player indicator move eight positions 202 to another component-accumulating position 200*i*. The player receives a 2× multiplier component 208 associated with the component accumulating position 200*i* displayed in the multiplier award display 212.

The player continues to accumulate components associated with component-accumulating positions until the gaming device indicates a selection position. In FIG. 8C the gaming device has generated the number of positions to be moved is three 202 indicating selection position 210*a*. In one embodiment, when the gaming device designates or indicates a selection position, the award opportunity associated with the selection position is presented to the player as an alternative to at least one of the accumulated award opportunities generated by components accumulated in previous moves to component-accumulating positions. Alternatively, each accumulated award opportunity is paired or grouped with at least one of the award opportunities associated with the selection position. In this embodiment, a processor randomly selects and indicates one of the groups such as a pair of award opportunities including the accumulated award opportunity. A player then chooses one of the award opportunities in the indicated group to obtain the award opportunity and receive the outcome associated with the selected award opportunity.

Figure 8D:
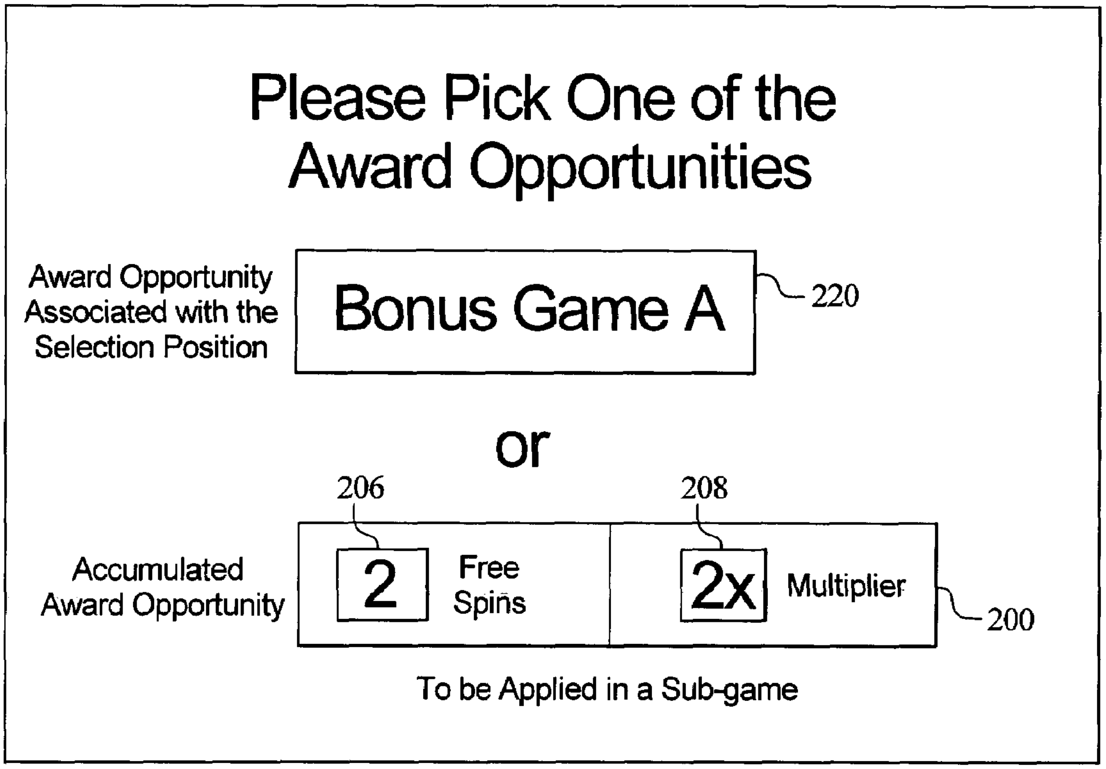
FIG. 8D is an enlarged elevation view of a display screen adapted to be displayed to a player to enable the player to choose between a plurality of different award opportunities of one embodiment of the present invention.

In FIG. 8D, the award opportunity associated with the selection position 210*a* includes an alternative game or bonus event 220. Therefore, the player must select between bonus game A and the accumulated award opportunity which includes both free spin and multiplier components 206 and 208. Alternatively, each type of component 206 and 208 is associated with different accumulated award opportunities to be selected by the player. In a further alternative, one component, such as the multiplier 208, modifies another component, such as the free spins 206, to yield a total of four free spins to be applied in another or the same game. If the player selects the award opportunity associated with the selection position, the player will be directed to another display, in one embodiment, where bonus game A 220 is presented to the player. Alternatively, the same display will transform into bonus game A 220.

If the player selects the accumulated award opportunity 200, in one embodiment, the gaming device 10 will provide the award to the player or modify a previous award according to the outcome of the award opportunity, and the game will end. Alternatively, the award will be applied in, or transferred to an alternative game such as a sub-game. In one embodiment, the sub-game may include a separate display in which the gaming device randomly generates award symbols on a plurality of reels, a mechanical wheel display or any other display device. It should be appreciated that the sub-game may be any suitable game.

If the player elects to apply the accumulated award of 2 free spins 206 and the 2× multiplier 208 to a sub-game, the player, in one embodiment, enters the example of a sub-game described and illustrated in FIG. 5A or 5B above. The free spins 206 are used in the sub-game to increase the chances of winning an award. Likewise, any award provided to the player in the sub-game is modified by the multiplier 208. Referring back to FIGS. 5A and 5B, the sub-game provides the player two free spins 206 as indicated in the accumulated free spin award or spins remaining display 116*a*, and a “2×” multiplier 208 as indicated by the accumulated multiplier award display 117*a* of FIG. 8B. The player uses the free spins 206 to initiate the random generation of award symbols representing outcomes until no spins remain in the game as indicated in the spins remaining display 116*a*. The indicated awards in each spin are multiplied by the multiplier 208 indicated in the multiplier display

117*a* to produce an outcome of the accumulated award opportunity. The multiplied award is then transferred to the total award display 118*a*, and the player receives the total award indicated in the total award display 118*a* as the outcome for selecting the accumulated award option of the game. In one embodiment, the total award is transferred to the primary game.

In one embodiment, when the player has accumulated a maximum number of award components or a maximum outcome in the game without moving to a selection position, the gaming device automatically chooses or requires the player to choose between at least one of the award opportunities associated with a selection position and the accumulated award opportunity. In one embodiment, the award opportunity associated with the selection position closest to the last occupied component-accumulating position in a forward direction is provided as a choice to the player. Alternatively, the gaming device randomly selects an award opportunity or, in an alternative embodiment, allows the player to select from a plurality of award opportunities to determine the award opportunity to be presented to the player for selection.

Figure 9:
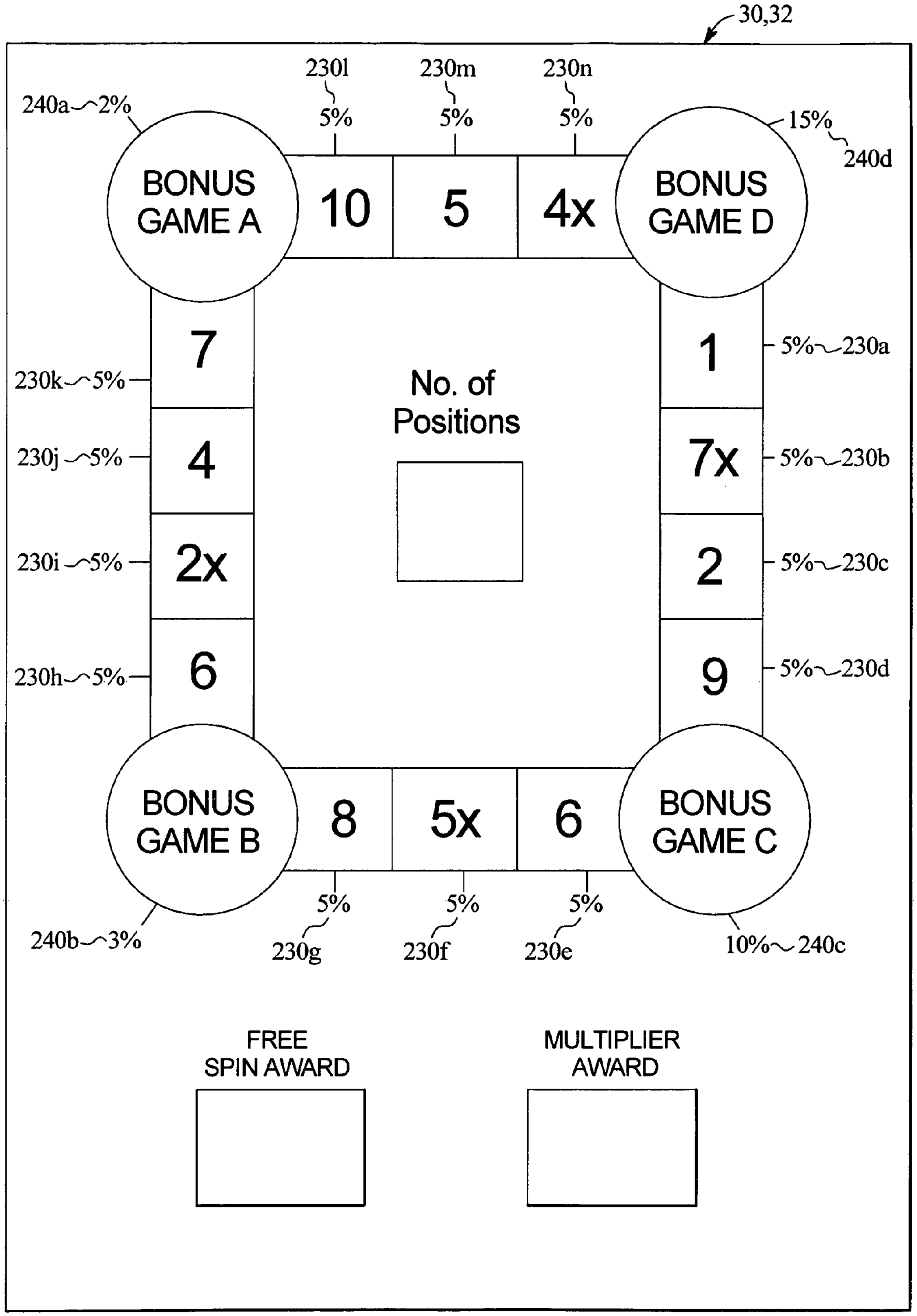
FIG. 9 is an enlarged from elevation view of the alternative display device of FIGS. 8A to 8C illustrating an example distribution of probabilities associated with each position.

In one embodiment, a probability is associated with each component-accumulating position, each selection position, or both component-accumulating and selection positions. FIG. 9 illustrates an example distribution of probabilities among the component-accumulating award and selection positions 230 and 240. The player in this example has a 70% probability of moving to a component-accumulating position 230 (the sum of the probabilities associated with each of the component-accumulating positions 230*a* to n) and a 30% probability of moving to a selection position 240 (the sum of the probabilities associated with each of the selection positions 240*a* to *d*). Alternatively, a different probability is associated with each component-accumulating position and, in one embodiment, is based on the components associated with the positions. It should also be appreciated that the number of components associated with component accumulating positions can be variable such as chosen from a larger set of possible components or numbers of components. In other words, the positions do not have to be static as illustrated in the above example.

Figure 10:
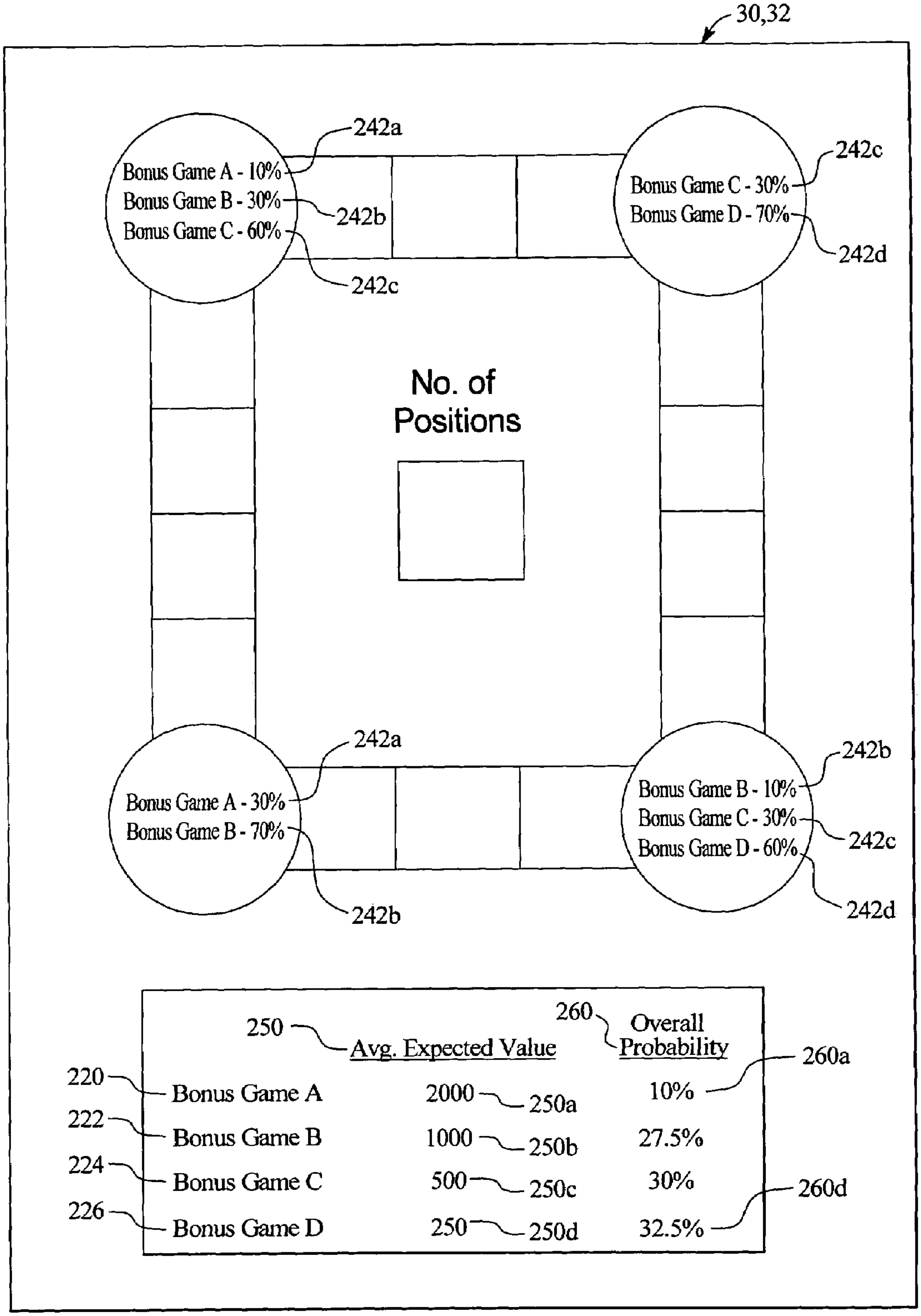
FIG. 10 is an enlarged from elevation view of the alternative display device of FIGS. 8A to 8C illustrating an example distribution of probabilities associated with each bonus game associated with the selection positions.

In one embodiment which includes a plurality of award opportunities associated with a selection position, one embodiment includes a probability associated with each award opportunity associated with the selection position. The likelihood of the award opportunity being indicated by the gaming device to be presented to the player as a choice is based on the probability associated with the bonus game. Referring to FIG. 10, an embodiment of the present invention includes a probability 260 associated with each award opportunity such as alternative games or bonus events associated with the selection positions 210*a* to 210*d*. In one embodiment, the probability 260 of an individual bonus game is different than the probability of another individual bonus game. In one embodiment, the probability associated with each bonus game is based on the average expected value 250 the player is likely to achieve by playing the bonus game. In one embodiment, the probability of the bonus game to be indicated or selected from the group associated with a selection position is inversely proportional to the average expected value of that bonus game. In other words, the lower the average expected value likely to be achieved by the player in the bonus game, the higher the probability of the bonus game being selected by the gaming device.

In FIG. 10, bonus game A 220 has an average expected value of two thousand 250*a*, the highest of the bonus games available to the player in the illustrated game. As a result of the high average expected value associated with bonus game A 250*a*, in one embodiment, the game has a relatively low overall likelihood (10%) of being selected from the groups of bonus games associated with the selection positions 210. Conversely, bonus game D 226 only has an average expected value of two hundred fifty 250*d*, and, therefore, has a higher overall likelihood of being selected (32.5%). It should be appreciated that alternative embodiments may vary the level of correlation between the probability 240 of an award opportunity being selected by the gaming device and the average expected value 250 assigned to that award opportunity.

It should also be appreciated that the gaming device can select from a plurality of alternative games or sub-games to be initiated if the player chooses the accumulated award opportunity to apply the components of the accumulated award opportunity to the sub-game. Like the bonus games, in one embodiment, the sub-games include a probability associated with the game that regulates the frequency the sub-game is selected by the gaming device. Moreover, the sub-game may have an average expected value associated with the game that is related to the probability of that game being selected.

Referring now to FIG. 11, the table 300 illustrates a correlation between ranges of average expected values for win spins and selectable games which have average expected values in the respective ranges. In one embodiment of the present invention, the award opportunity for the non-accumulated award opportunity is a selected game with the average expected value corresponding to the range of average expected values for the accumulated award opportunity. In other words, the processor picks the game A, B, C, or D with the appropriate expected average value for the non-accumulated award opportunity to correspond to the average expected value of the accumulated award opportunity.

It should also be appreciated that the gaming device of the present invention can, similar to the embodiment described above, form a plurality of pairs of award opportunities, wherein at least one of the award opportunities in at least one pair is an accumulated award opportunity. In such case, one of the pairs of award opportunities is indicated and the player chooses one of the award opportunities in the indicated pair of award opportunities. The gaming device provides the player with the outcome resulting from the award opportunity picked by the player from the indicated pair.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device operable under control of a processor, said gaming device comprising:

a game adapted to be displayed to a player;

a plurality of award components in said game; and a plurality of award opportunities in said game;

said processor programmed for a play of the game to:

(a) generate at least one accumulated award opportunity by;

(i) causing a selection of at least one of the award components during said play of the game, and combining the award components selected during said play of the game, (b) after combining said selected award components of said at least one accumulated award opportunity, cause an indication of at least two of the award opportunities including said at least one generated accumulated award opportunity and enable the player to pick one of the indicated award opportunities, and (c) provide the player with any outcome resulting from the award opportunity picked by the player, wherein the outcome which will result from one of said accumulated award opportunities is based on the selected award components of said accumulated award opportunity.

2. The gaming device of claim 1, wherein the award components of the accumulated award opportunity are randomly selected.

3. The gaming device of claim 1, wherein the processor is programmed to determine one or more of the award components of the accumulated award opportunity.

4. The gaming device of claim 1, wherein the selected award components of the accumulated award opportunity are combined by a mathematical operation.

5. The gaming device of claim 1, wherein the selected award components of the accumulated award opportunity are used in another game of the gaming device.

6. The gaming device of claim 1, which includes a probability of being selected associated with each of the award components of the accumulated award opportunity.

7. The gaming device of claim 1, which includes at least two different accumulated award opportunities which include different types of award components.

8. The gaming device of claim 7, wherein at least one of the types of award components of at least one of said accumulated award opportunities include a number of free activations and a multiplier.

9. The gaming device of claim 1, wherein the award components of at least one accumulated award opportunity include a number of free activations of another game.

10. The gaming device of claim 1, which includes a plurality of component-accumulating positions.

11. The gaming device of claim 10, wherein the plurality of award components are associated with the plurality of component-accumulating positions.

12. The gaming device of claim 10, wherein at least one award component is associated with each component-accumulating position.

13. The gaming device of claim 10, wherein the processor is programmed to cause a display of the award components associated with at least one component-accumulating position.

14. The gaming device of claim 10, which includes a probability of being selected associated with at least one component-accumulating position.

15. The gaming device of claim 1, wherein the number of indicated award opportunities is based upon an event associated with another game.

16. The gaming device of claim 1, wherein at least two of the award opportunities are indicated upon a triggering event in the game.

17. The gaming device of claim 16, wherein the triggering event includes an indication of at least one selection position.

18. The gaming device of claim 17, wherein at least one of the award opportunities is associated with said selection position.

19. The gaming device of claim 1, which includes a probability of being indicated associated with said selection position.

20. The gaming device of claim 1, which includes a probability of being indicated associated with each award opportunity.

21. The gaming device of claim 1, wherein the processor is programmed to randomly pick at least one of the indicated award opportunities.

22. The gaming device of claim 1, wherein at least one of the award opportunities includes: at least one of a bonus event, a predetermined award, a progressive award, a progressive number of free activations of another game, a randomly determined award, a free activation in a primary game, a free activation in a bonus event, a free game in a primary game, a free game in a bonus event, a multiplier and any combination thereof.

23. The gaming device of claim 1, wherein the outcomes which will result from at least one of the award opportunities include at least one of the group consisting of: credits, other awards, other values, free spins, free games, progressive awards, progressive numbers of free spins, multipliers and combinations thereof.

24. A gaming device operable under control of a processor, said gaming device comprising:

a game adapted to be displayed to a player;

a plurality of award components in said game; and a plurality of pairs of award opportunities;

said processor programmed for a play of the game to:

(a) generate at least one accumulated award opportunity for each pair of award opportunities, wherein each accumulated award opportunity is generated by:

(i) causing a selection of at least one of the award components during said play of the game, and (ii) combining said award components selected during said play of the game, (b) after combining the selected award components for each of said accumulated award opportunities, cause an indication of one of the pairs of award opportunities, said indicated pair of award opportunities including at least one of the generated accumulated award opportunities, (c) enable the player to pick one of the award opportunities in the indicated pair of award opportunities, and (d) provide the player with any outcome resulting from the award opportunity picked by the player from the indicated pair of award opportunities, wherein the outcome which will result from one of the accumulated award opportunities is based on the selected award components of said accumulated award opportunity.

25. The gaming device of claim 24, wherein each paired award opportunity is randomly selected from a plurality of award opportunities.

26. The gaming device of claim 24, wherein each pair of award opportunities includes the same accumulated award opportunity.

27. The gaming device of claim 24, wherein each pair of award opportunities includes two different types of award opportunities.

28. The gaming device of claim 24, wherein the award components of each of the accumulated award opportunities are randomly selected.

29. The gaming device of claim 24, wherein the processor is programmed to cause a display of the combined selected award components of each accumulated award opportunity.

30. The gaming device of claim 24, wherein the selected award components of each accumulated award opportunity are combined by a mathematical operation.

31. The gaming device of claim 24, wherein the selected award components of each accumulated award opportunity are used in another game.

32. The gaming device of claim 24, which includes a probability of being selected associated with each of the award components.

33. The gaming device of claim 24, which includes two accumulated award opportunities which include different types of award components.

34. The gaming device of claim 33, wherein at least one of the types of award components of at least one accumulated award opportunity include a number of free activations and a multiplier.

35. The gaming device of claim 24, wherein the award components of at least one accumulated award opportunity include a number of free activations of another game.

36. The gaming device of claim 24, which includes a plurality of component-accumulating positions.

37. The gaming device of claim 36, wherein at least one award component is associated with each component-accumulating position.

38. The gaming device of claim 36, wherein any award component associated with at least one component-accumulating position is selected if said position is designated.

39. The gaming device of claim 36, which includes a probability of being designated associated with at least one component-accumulating position, wherein the likelihood of one of the component-accumulating positions being designated is based on said probability.

40. The gaming device of claim 24, wherein at least one pair of award opportunities is indicated upon a triggering event.

41. The gaming device of claim 40, wherein the triggering event includes a designation of at least one selection position.

42. The gaming device of claim 41, wherein at least one of the pair of award opportunities is associated with at least one selection position.

43. The gaming device of claim 24, which includes a probability of being selected associated with each pair of award opportunities, wherein the likelihood of a pair of award opportunities being indicated is based on said probability.

44. The gaming device of claim 24, wherein the processor is programmed to randomly select the indicated pair of award opportunities.

45. The gaming device of claim 24, wherein at least one of the award opportunities includes: at least one of a bonus event, a predetermined award, a progressive award, a progressive number of free activations of another game, a randomly determined award, a free activation in a primary game, a free activation in a bonus event, a free game in a primary game, a free game in a bonus event, a multiplier and any combination thereof.

46. The gaming device of claim 24, wherein the outcomes which will result from at least one of the award opportunities include at least one of the group consisting of: credits, other awards, other values, free spins, free games, progressive awards, progressive numbers of free spins, multipliers and any combination thereof.

47. A gaming device operable under control of a processor, said gaming device comprising:

a game adapted to be displayed to a player;

a plurality of award components in said game;

a plurality of award opportunities in said game, wherein each award opportunity includes a sub-game and each award opportunity has an expected average outcome; and at least one accumulated award opportunity, wherein each accumulated award opportunity has an expected average outcome;

said processor operable for a play of the game to:

(a) generate said at least one accumulated award opportunity by:

(i) causing a selection of at least one of the award components during said play of the game, and (ii) combining said award components selected during said play of the game, (b) upon a triggering event, cause an indication of one of the generated accumulated award opportunities and one of the award opportunities which has a substantially similar expected average outcome to the average expected outcome of the indicated accumulated award opportunity, and enable the player to select one of the indicated accumulated award opportunity or the award opportunity, and (c) provide an award to the player based on the player selected one of the indicated accumulated award opportunity or the award opportunity.

* * * * *

UNITED STATES PATENT AND TRADEMARK OFFICE

CERTIFICATE OF CORRECTION

PATENT NO. : 7,235,011 B2
APPLICATION NO. : 10/660076
DATED : June 26, 2007
INVENTOR(S) : Randall et al.

It is certified that error appears in the above-identified patent and that said Letters Patent is hereby corrected as shown below:

On the title page, item [75]:

In Inventors change “Peter J.A. Marsh, Leight (GB)” to --Peter J.A. Marsh, Lancashire (GB)--.

Signed and Sealed this

Seventeenth Day of November, 2009

David J. Kappos
*Director of the United States Patent and Trademark Office*